US011954014B2

(12) United States Patent
Everitt et al.

(10) Patent No.: US 11,954,014 B2
(45) Date of Patent: Apr. 9, 2024

(54) AUTOMATED UNIT TESTING IN A MAINFRAME CICS ENVIRONMENT

(71) Applicant: BMC Software, Inc., Houston, TX (US)

(72) Inventors: Glenn Everitt, Waterford, MI (US); Douglas Watkins, Commerce Township, MI (US); Sheldon Spurrell, Brighton, MI (US); James Wright, Richmond, MI (US)

(73) Assignee: BMC Software, Inc., Houston, TX (US)

( * ) Notice: Subject to any disclaimer, the term of this patent is extended or adjusted under 35 U.S.C. 154(b) by 0 days.

(21) Appl. No.: 17/810,223

(22) Filed: Jun. 30, 2022

(65) Prior Publication Data

US 2022/0334955 A1    Oct. 20, 2022

Related U.S. Application Data

(62) Division of application No. 16/922,431, filed on Jul. 7, 2020, now Pat. No. 11,449,412.

(60) Provisional application No. 62/955,876, filed on Dec. 31, 2019.

(51) Int. Cl.
    *G06F 11/36*    (2006.01)
(52) U.S. Cl.
    CPC ...... *G06F 11/3664* (2013.01); *G06F 11/3684* (2013.01); *G06F 11/3688* (2013.01)
(58) Field of Classification Search
    CPC ............. G06F 11/36–3696; G06F 11/34–3495
    See application file for complete search history.

(56) References Cited

U.S. PATENT DOCUMENTS

| 5,590,329 | A | * | 12/1996 | Goodnow, II ...... G06F 11/3624 |
| | | | | 717/132 |
| 6,047,389 | A | | 4/2000 | Thai |
| 7,130,786 | B2 | | 10/2006 | Grebenev |
| 7,392,507 | B2 | | 6/2008 | Kolawa et al. |
| 8,127,316 | B1 | | 2/2012 | Binotto et al. |
| 10,528,457 | B2 | | 1/2020 | Everitt et al. |

(Continued)

OTHER PUBLICATIONS

G. Everitt: "No Mock Objects for your Mainframe? Create COBOL Stubs", BMC [online], 2017 [retrieved May 21, 2022], Retrieved from Internet: <URL: https://www.bmc.com/blogs/cobol-program-stubs/>, pp. 1-7.

*Primary Examiner* — Todd Aguilera
(74) *Attorney, Agent, or Firm* — Brake Hughes Bellermann LLP

(57) ABSTRACT

An automated system is presented for unit testing an application in a mainframe execution environment. A plurality of stub objects reside in the mainframe execution environment, such that each stub object in the plurality of stub objects represents a different stub type. A command translator table is configured with an entry for each command available for an online transaction processor. Each entry in the command translator table specifies a stub type for the command and includes a listing of possible arguments associated with the given command, such that each possible argument in the listing of possible arguments has a specified category type. A test configurator executes in the mainframe execution environment and is configured to receive and parse a test input file. A setup routine interacts with the test configurator to receive records from the test input file.

14 Claims, 19 Drawing Sheets

(56) References Cited

U.S. PATENT DOCUMENTS

| | | |
|---|---|---|
| 10,990,515 B2 | 4/2021 | Everitt et al. |
| 11,449,412 B2 * | 9/2022 | Everitt ................ G06F 11/3636 |
| 2005/0027470 A1 | 2/2005 | Tonomura et al. |
| 2005/0104859 A1 | 5/2005 | Need et al. |
| 2005/0120276 A1 | 6/2005 | Kolawa et al. |
| 2005/0197815 A1 | 9/2005 | Grebenev |
| 2006/0101476 A1 | 5/2006 | Robert |
| 2009/0259699 A1 | 10/2009 | Chasman et al. |

\* cited by examiner

AUTOMATED UNIT TESTING IN A MAINFRAME CICS ENVIRONMENT

CROSS-REFERENCE TO RELATED APPLICATIONS

This application is a divisional of, and claims priority to, U.S. patent application Ser. No. 16/922,431, filed Jul. 7, 2020, which claims the benefit of U.S. Provisional Application No. 62/955,876, filed on Dec. 31, 2019, the entire disclosures of which are incorporated herein by reference in their entireties.

FIELD

The present disclosure relates to unit testing and in particular, automating unit testing an application which interfaces with an online transaction processor of a mainframe environment.

BACKGROUND

Unit testing is an important part of application development because it enables developers to validate incremental code changes. However, much of the unit testing done today is manual, prompting developers to skip unit testing altogether, which can result in the use of poor quality code in subsequent testing phases, or worse, can negatively impact end-user experiences.

Unit testing allows developers to test programs with a "divide and conquer" approach; that is, test small portions of a program, as many times as necessary, to immediately ensure the program functions as it should prior to performing more complex, time consuming and costly tests. Automated unit testing significantly accelerates the testing process and enables IT to put regular code updates into production at a pace necessary for fast, frequent releases.

By automating unit testing, developers can immediately validate incremental changes to code, thus reducing the risk of introducing even slight defects into the code base that might not otherwise be caught until much later in the testing process when they will be much costlier to fix.

This section provides background information related to the present disclosure which is not necessarily prior art.

SUMMARY

This section provides a general summary of the disclosure, and is not a comprehensive disclosure of its full scope or all of its features.

An automated system is presented for unit testing an application in a mainframe execution environment. The system includes a plurality of stub objects, a command translator table, a test configurator and a setup routine. The plurality of stub objects residing in the mainframe execution environment, such that each stub object in the plurality of stub objects represents a different stub type. The command translator table is configured with an entry for each command available for an online transaction processor. Each entry in the command translator table specifies a stub type for the command and includes a listing of possible arguments associated with the given command, such that each possible argument in the listing of possible arguments has a specified category type. The test configurator executes in the mainframe execution environment and is configured to receive and parse a test input file. The test input file includes at least one record for a particular command issued by the application for the online transaction processor. The setup routine interacting with the test configurator to receive records from the test input file.

Upon reading the at least one record from the test input file, the setup routine retrieves an entry corresponding to the particular command from the command translator table and operates to create an object for the particular command in the mainframe execution environment, such that the command object is instantiated from a class representing the command type and is a property of a given stub object in the plurality of stub objects. The setup routine also determines arguments associated with the particular command and operates to create an object for each argument associated with the particular command in the mainframe environment, such that the argument objects is a property of the command object for the particular command. In addition, the setup routine determines arguments associated with the particular command using existence bits in an array previously collected from the online transaction processor.

In one aspect, the test configurator is configured to update an address for a handler of the online transaction processor with an address for an interceptor routine and initiate testing of the application. During execution of the application, the interceptor routine receives a call for a particular command available through the online transaction process and interacts with methods provided by a command object for the particular command, where the command object is instantiated by the test configurator from a class representing the command type and is a property of a given stub object in the plurality of stub objects.

In another aspect, the test recorder is configured to receive a request to test the application and, in response to receiving the request, scans source code of the application to identify pointer data fields in the application and build a pointer reference table, where each entry in the pointer reference table includes an identifier for a particular pointer data field and a reference to a structure associated with the particular pointer data field. A debug tool executes in the mainframe execution environment and coordinates testing of the application in the mainframe execution environment. Upon encountering a breakpoint for a given program call statement during execution of the application, the debug tool retrieves arguments of the given program call statement and, for each argument, determines whether the argument contains a pointer and resolves the pointers using the pointer reference table. The test recorder creates a record for the given program call statement in a test input file for the application, where the record includes the resolved pointer data.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 4A:
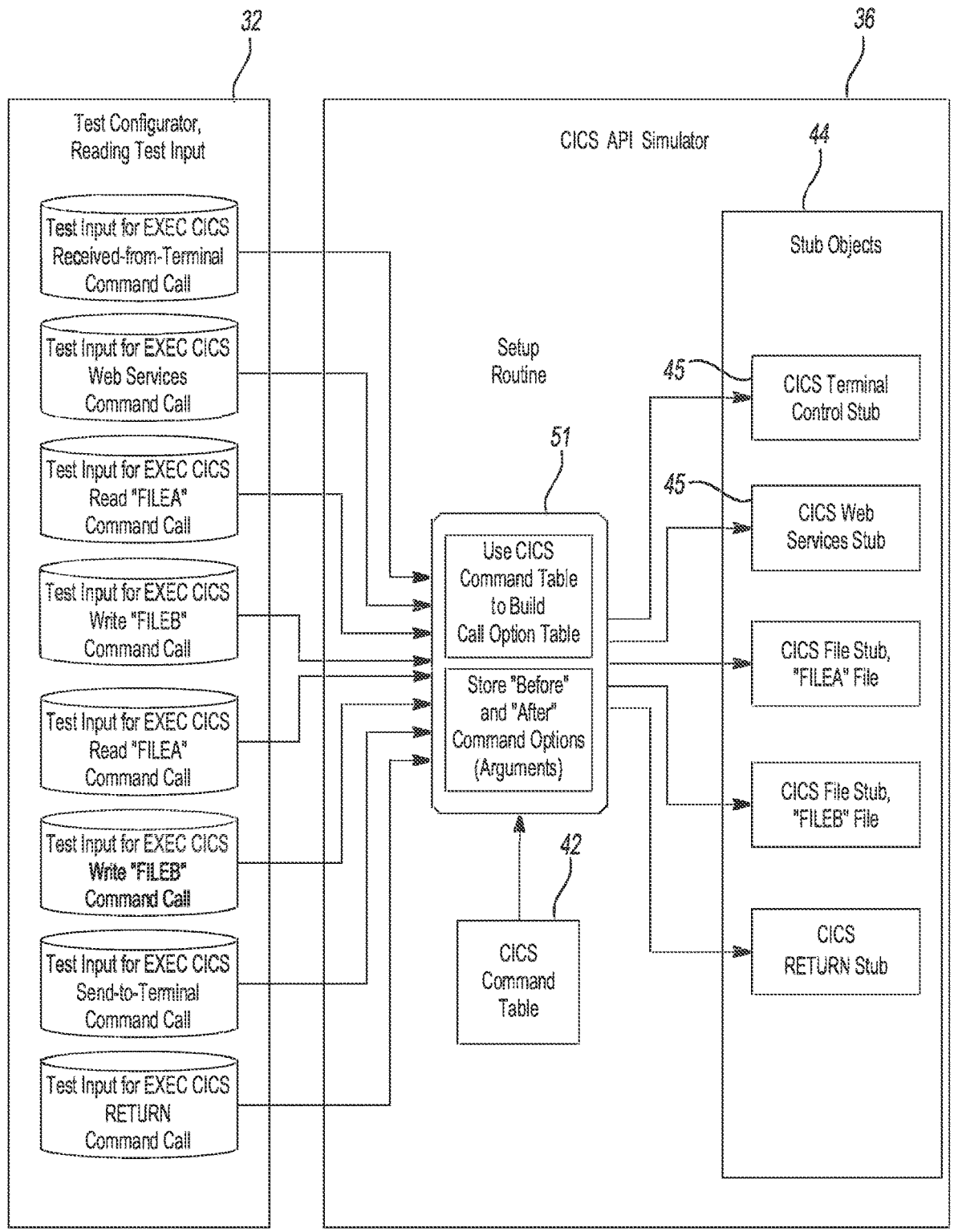
Figure 4B:
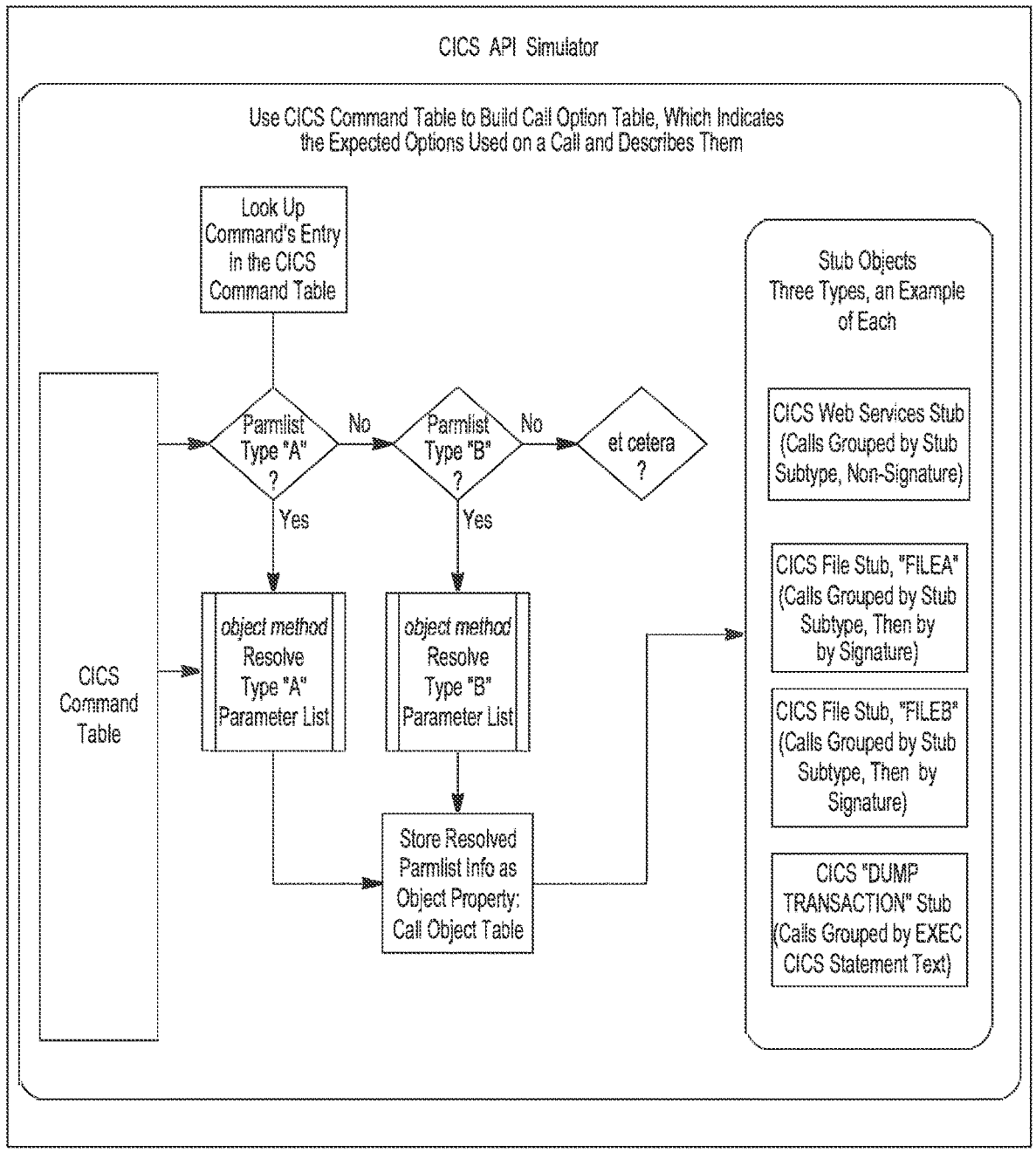
Figure 4C:
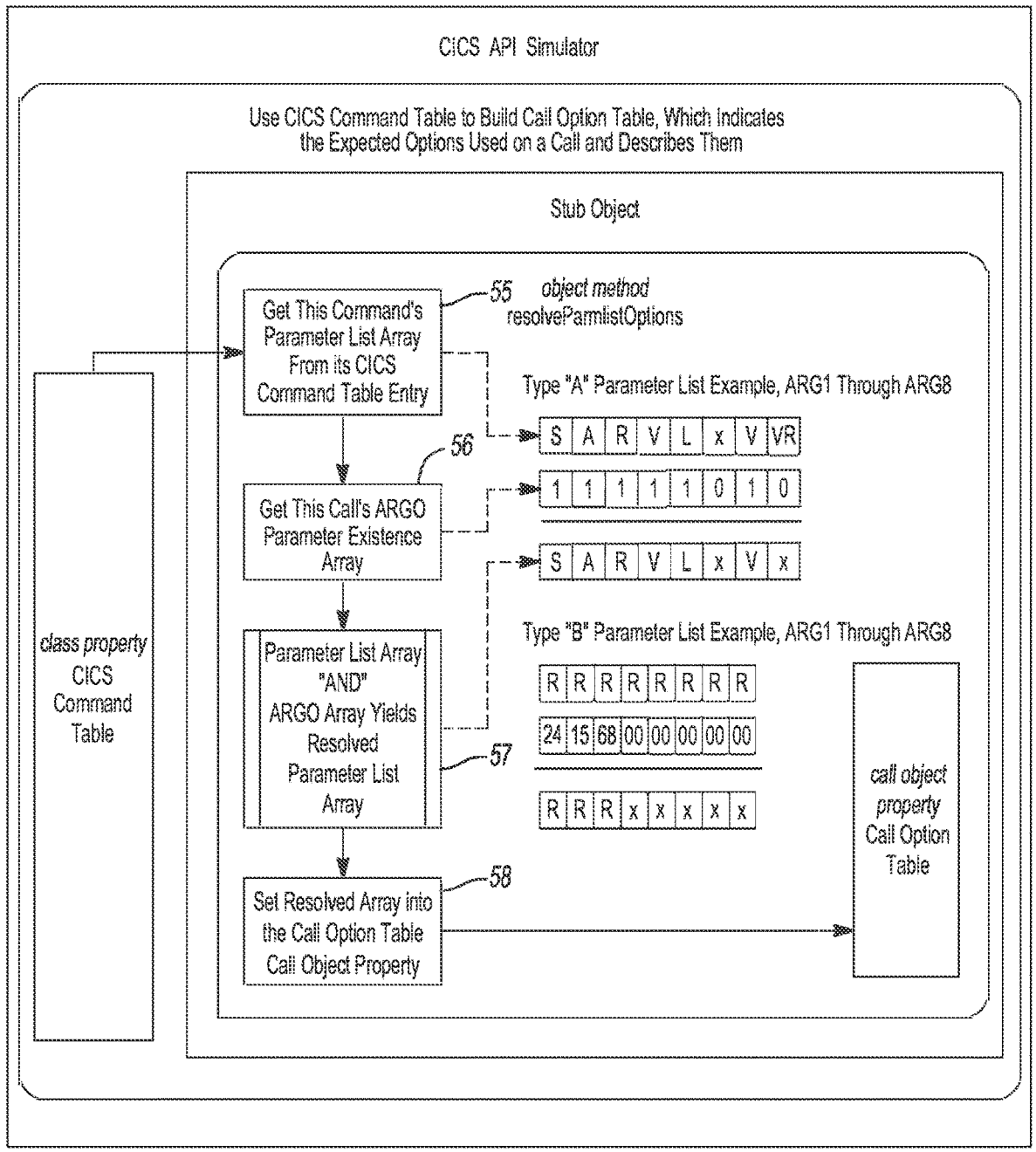
Figure 5:
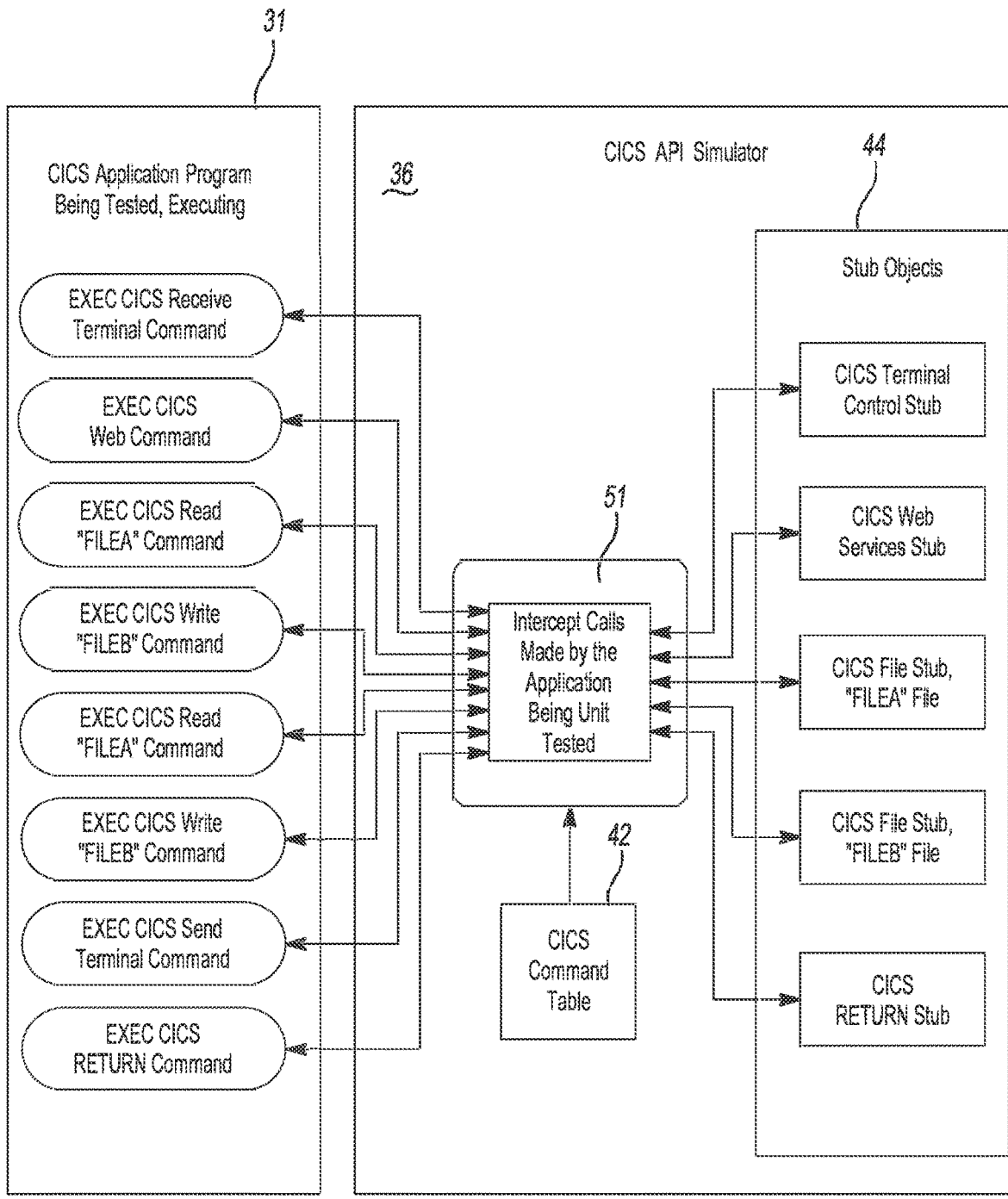
Figure 7:
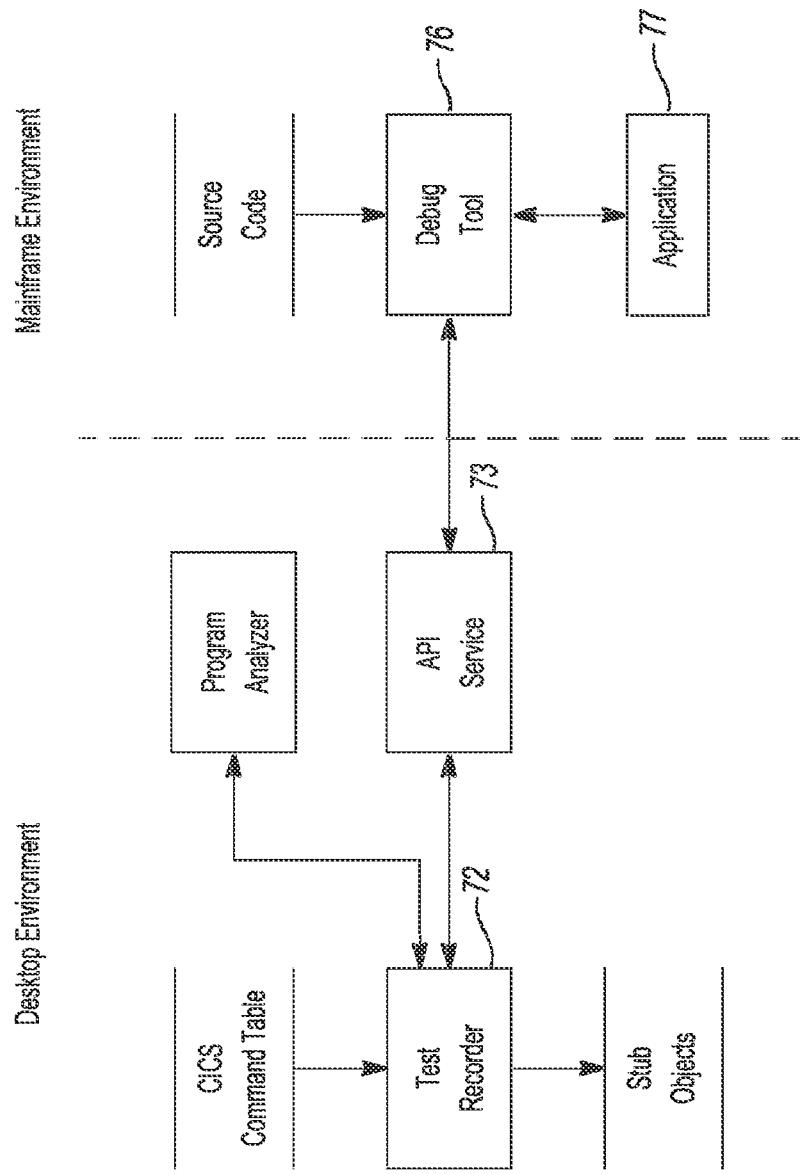

FIG. 4A provides an overview of the principle components used to create the data stubs for CICS commands;

FIGS. 4B and 4C are diagrams further illustrating how the setup routine updates the command objects for handling CICS commands in the mainframe environment;

FIG. 5 provides an overview of how CICS commands are intercepted by the CICS simulator;

FIGS. 6A-6G are diagrams further illustrating how the interceptor routine handles calls made by the application being unit tested;

FIG. 7 is a diagram further illustrating the test case generation process.

Figure 8A:
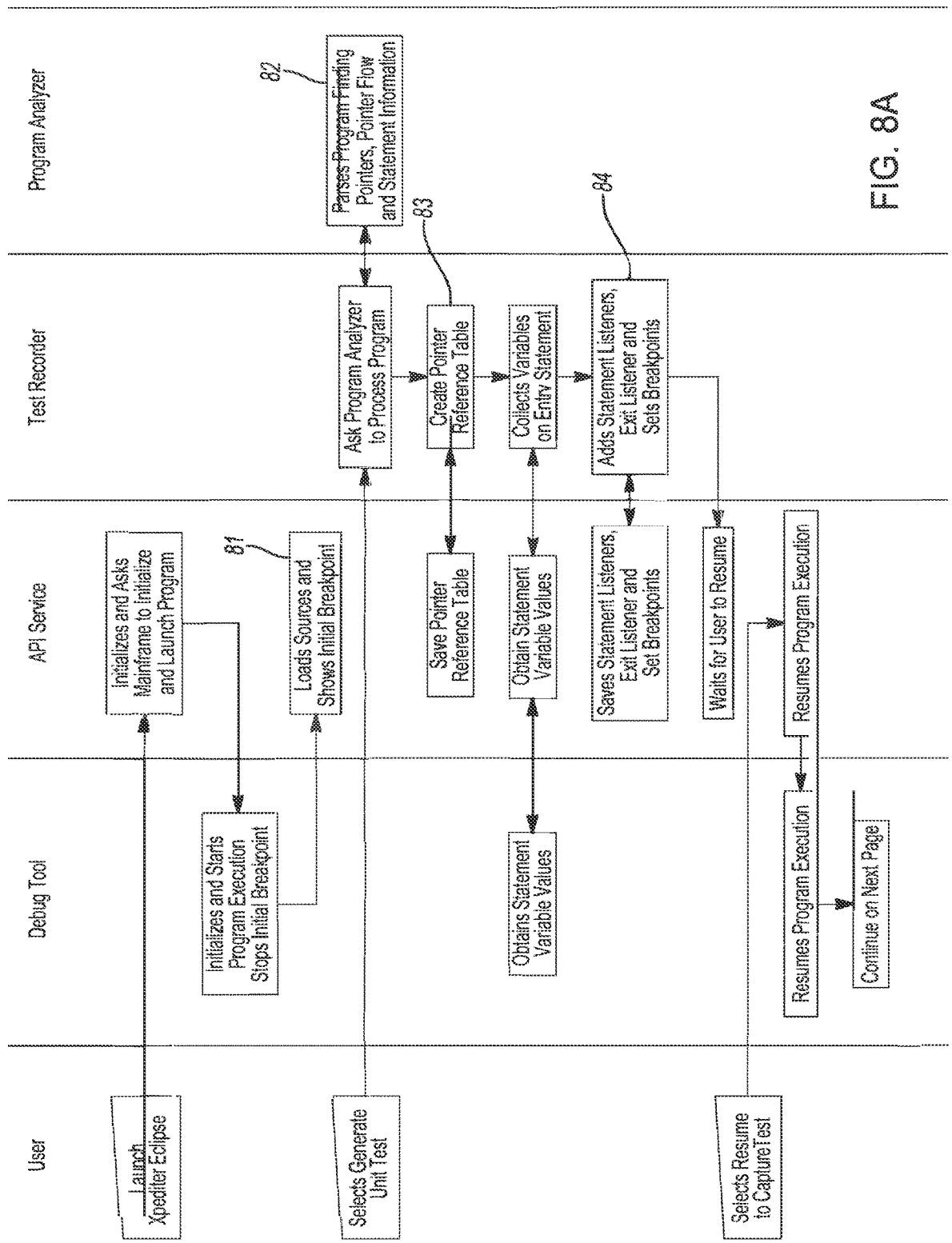
Figure 8B:
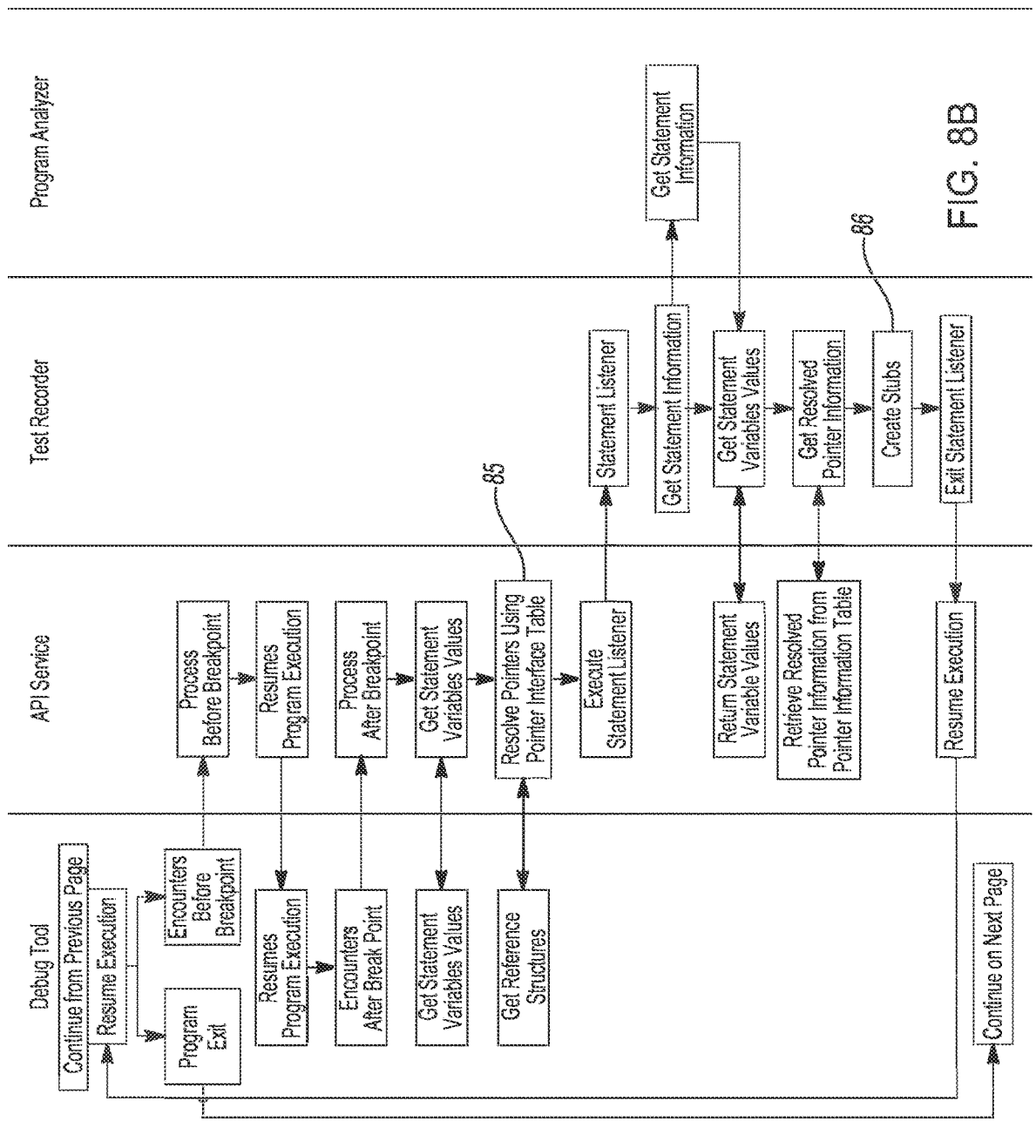
Figure 8C:
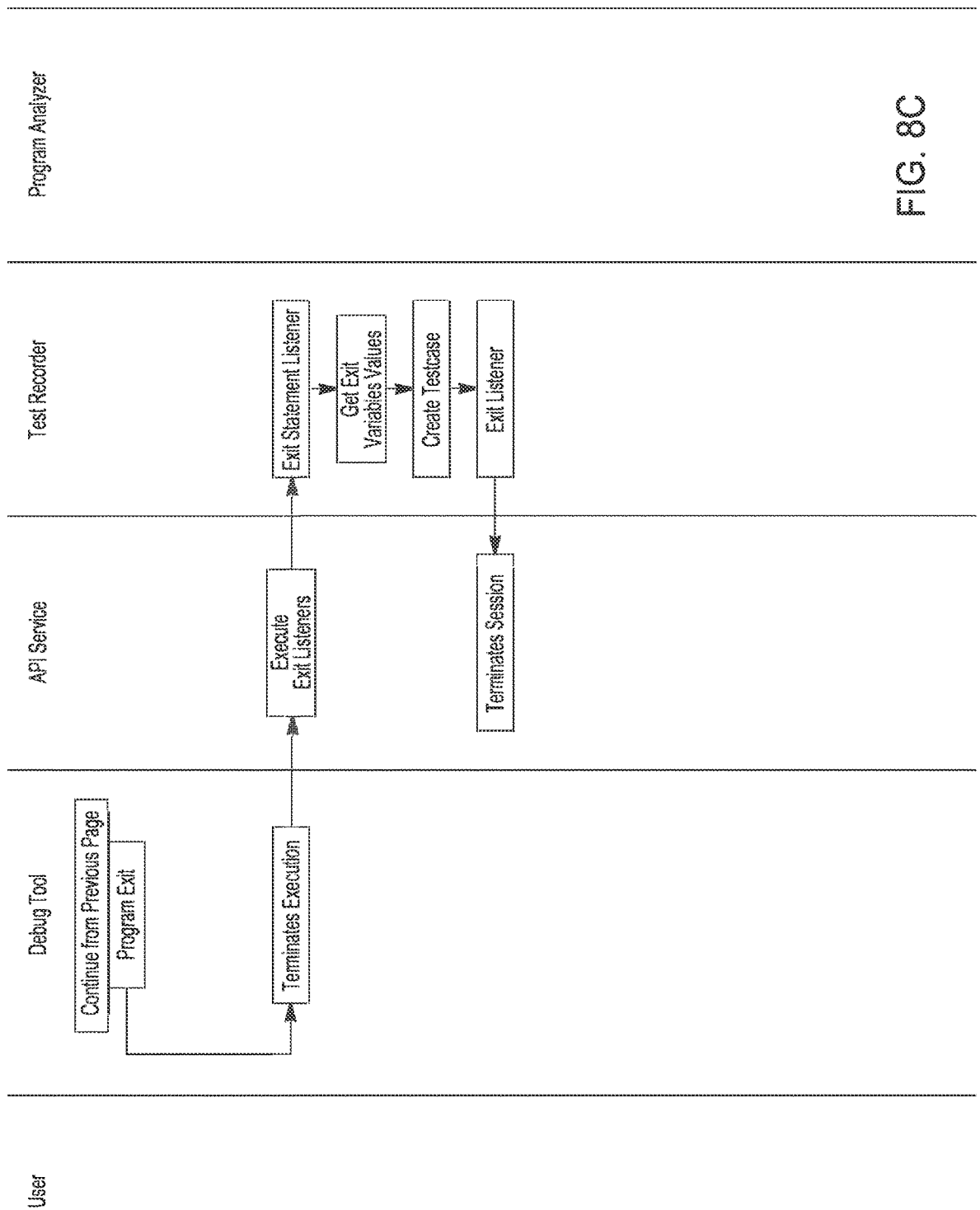

FIGS. 8A-8C are flow diagrams depicting an example process for handling pointers.

Corresponding reference numerals indicate corresponding parts throughout the several views of the drawings.

DETAILED DESCRIPTION

Example embodiments will now be described more fully with reference to the accompanying drawings.

Figure 1:
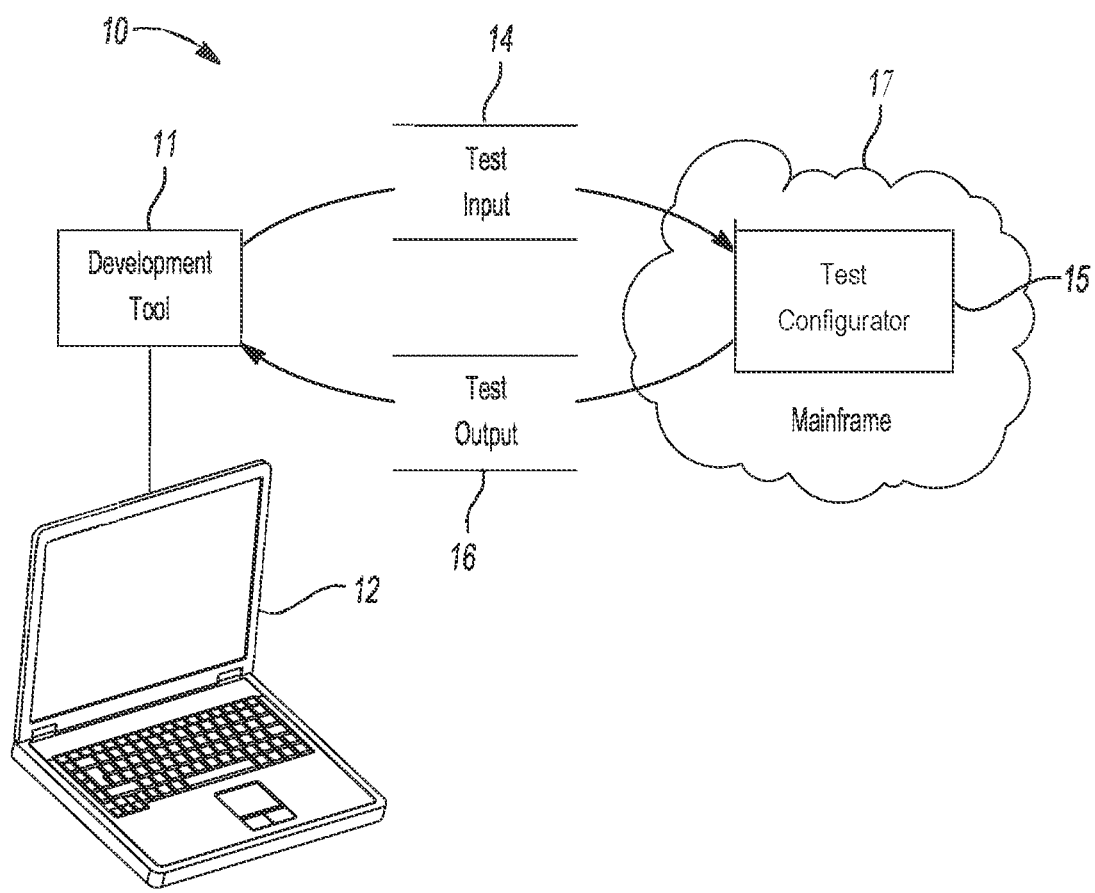
FIG. 1 is a diagram of an automated system for unit testing an application in a mainframe execution environment.

FIG. 1 depicts an example of an automated system 10 for unit testing an application in a mainframe execution environment. In this example, an integrated development tool 11 resides on a desktop computer 12. For a given test scenario, a test input file 14 is uploaded to a test configurator 15 residing in the mainframe test environment 17. A unit test of the application is then run in the mainframe test environment and thereby produces test results captured in a test output file 16. The test output file 16 is downloaded by the test configurator 15 back to the desktop computer 12 for validation. Creation, starting mainframe execution and validation of unit testing applications is implemented by the integrated development tool 11 as will be further described below. In one embodiment, the integrated development tool 11 is the Topaz Workbench mainframe application development tool commercially available from Compuware Corporation. Functionality set forth in this disclosure may be integrated into this development tool as well as other development tools.

Figure 2A:
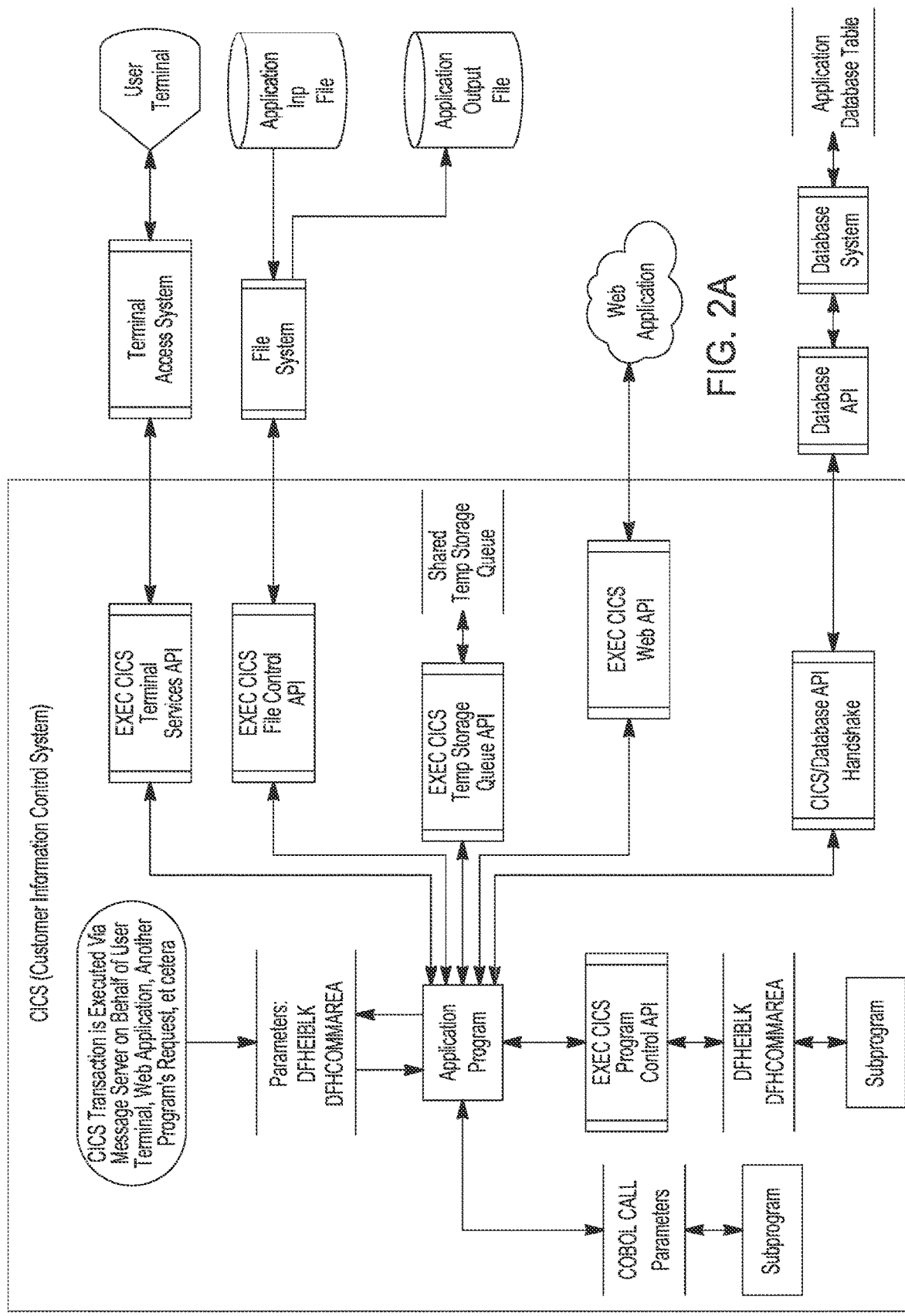
FIG. 2A is a diagram illustrating an application program running in a typical CICS environment.
Figure 2B:
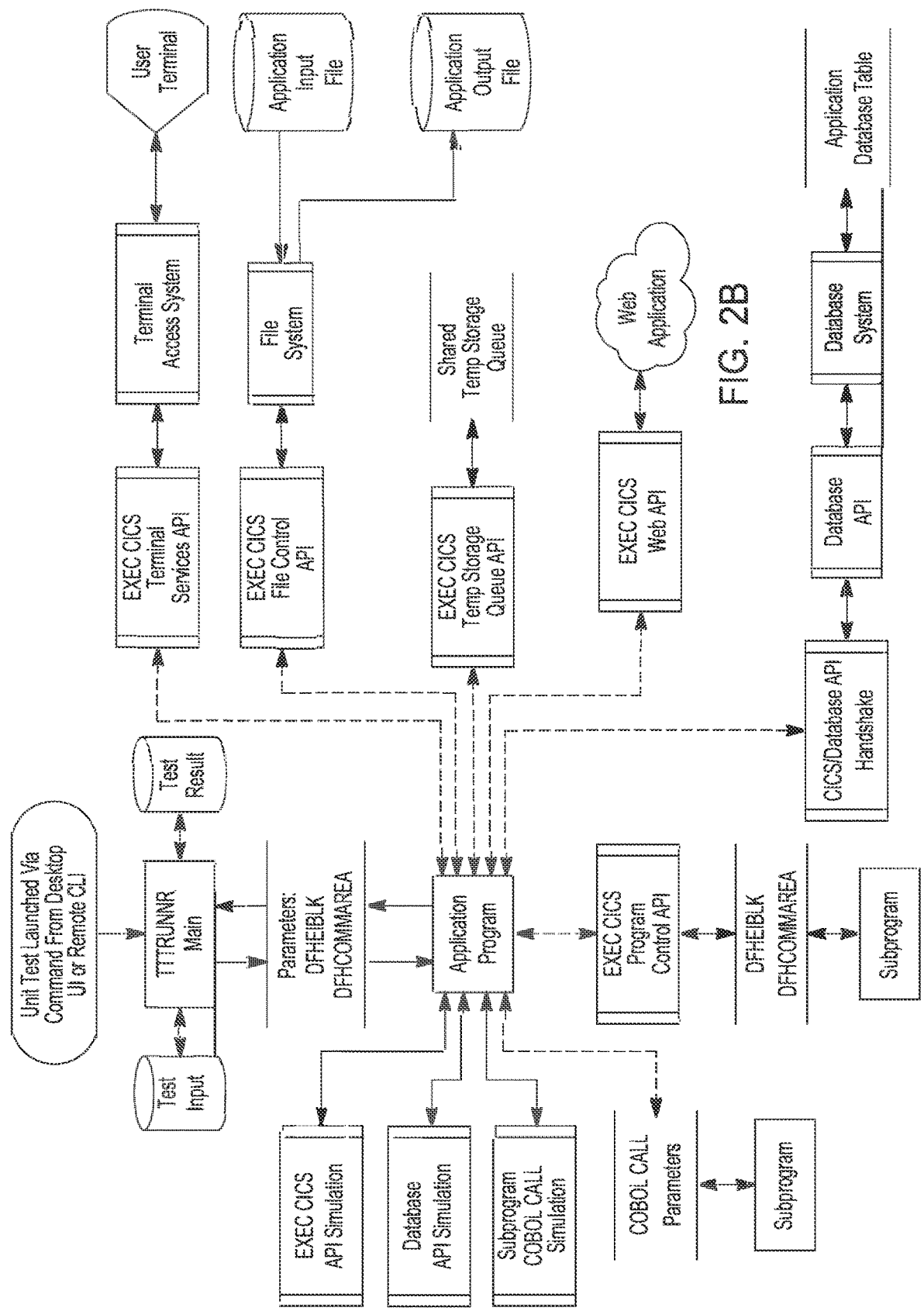
FIG. 2B is a diagram illustrating the application program being unit tested using the automated system.

Running a unit test in a mainframe environment is further described in relation to FIGS. 2A and 2B. For illustration purposes, the unit test is run in a z/OS mainframe system. Running a unit test on a z/OS mainframe system is typically done by submitting a file containing lines of Job Control Language (JCL) to the operating system (i.e., z/OS). However, this disclosure is concerned with unit testing an application which interfaces with an online transaction processor, such as Customer Information Control System (CICS). In this case, a CICS transaction is started via a message server, for example on behalf of a user terminal. However, running a unit test of a CICS transaction program may also be done by submitting a file containing lines of Job Control Language (JCL) to the operating system (i.e., z/OS), with no CICS environment present. FIG. 2A illustrates an application program running in a typical CICS environment; whereas, FIG. 2B illustrates the application program being unit tested in the automated system 10. While reference is made throughout this application to a particular online transaction processor, it is readily understood that the concepts presented in this disclosure are applicable to other online transaction processors suitable for mainframe environments as well as non-mainframe computing environments.

Figure 3:
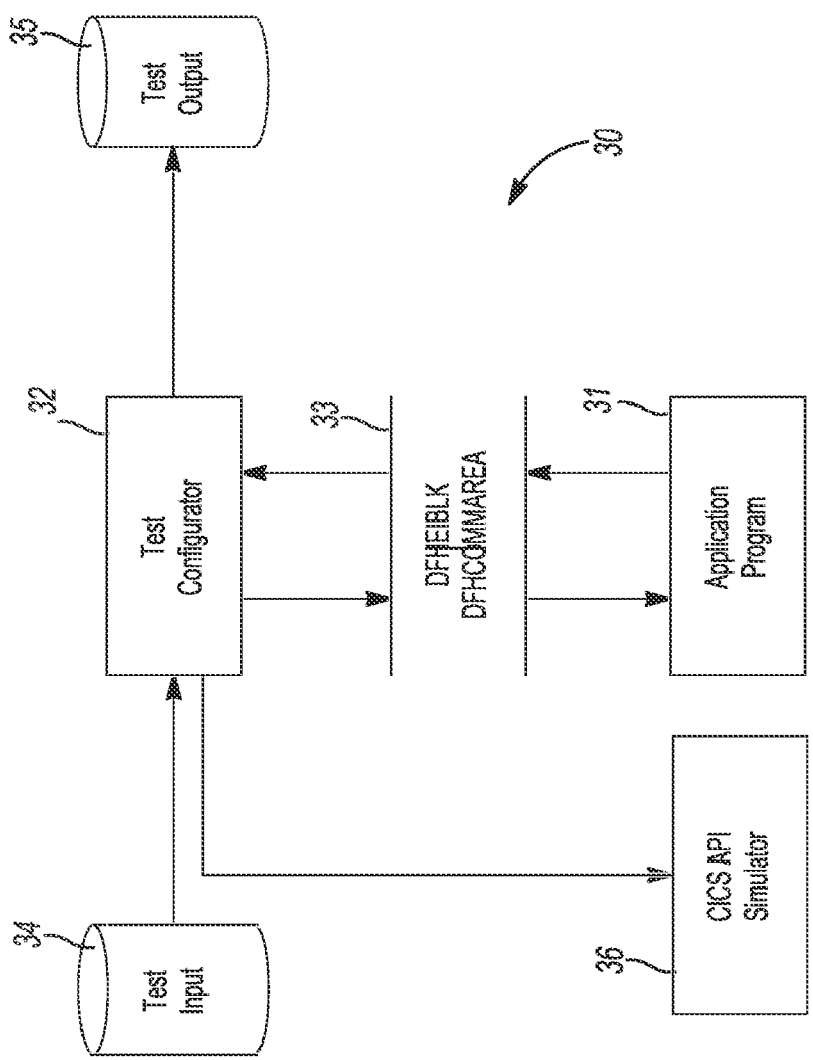
FIG. 3 is a diagram further depicting portion of the automated system running in the mainframe environment.

FIG. 3 further illustrates the system 30 for running a unit test of an application 31 in the mainframe environment. During execution, the application 31 may interface with different types of resources, including but not limited to input files, output files, databases, etc. This disclosure is particularly concerned with supporting unit testing of applications which interface with an online transaction processor, such as CICS. Support for interfacing with these other types of resources falls outside the scope of this disclosure and has been omitted for brevity. Further details for such interfacing may be found in U.S. Patent Publication No. 2019/0235999 entitled "Automated Unit testing in a Mainframe Environment" which is incorporated herein in its entirety.

A test configurator 32 orchestrates the running of the unit test in the mainframe environment. In this regard, the test configurator 32 is configured to receive and parse a test input file 34 which describes the test scenario. The test input file 34 will include input parameters for initializing the application 31. The test configurator 32 operates to retrieve values for the input parameters from the test input file 34 and pass the values of the input parameters to the application 31, thereby initializing the application 31. In the context of CICS, data is passed from the test configurator 32 to the application 31 using special memory areas 33 which are known as DFHEIBLK and DFHCOMMAREA. Standard user-program data areas can be passed to subprograms in CICS, too. The test configurator 32 then calls the application 31 to initiate unit testing of the application. Upon completing the unit test, the test configurator 32 likewise retrieves values of the parameters from the application 31 and generates a test output file 35.

Prior to initiating a unit test, the test configurator 32 creates the testing environment for the application 31. To do so, the test configurator 32 parses each record in the test input file and processes the record accordingly. The test input file 34 may include one or more records for subprogram calls made by the application 31 as well as one or more records for particular database calls made by the application. Additionally, the test input file 34 may include one or more records for particular commands issued by the application for the online transaction processor. Upon reading a record for a CICS command, the test configurator 32 interacts with a CICS simulator 36 to implement a data stub for the CICS command as will be further described below. In one embodiment, the test configurator 32 initiates execution of the CICS simulator 35 as part of creating the testing environment for the application. The test configurator 32 further operates to update an address for a handler of the online transaction processor with an address for the CICS simulator 36. In this way, commands issued by an application being unit tested will be directed to the CICS simulator 36.

FIG. 4A provides an overview of the principle components used to create the data stubs for CICS commands. The CICS simulator 36 includes a setup routine 41 which is responsible for building the data stubs. To do so, the setup routine 41 accesses a CICS command translator table 42. The command translator table 42 stores an entry for each CICS command. In an example embodiment, each entry in the command translator table 42 contains the following data fields: a function identifier, a command name, a command family, a stub subtype, a parameter list type and a listing of possible arguments for the command. For illustration purposes, a portion of the command translator table is set forth below:

| function id | command name | command family | stub subtype | parm list type |
|---|---|---|---|---|
| 0x0602 | READ | FC | FILE | A |
| 0x060E | READ NEXT | FC | FILE | A |
| 0x3802 | WEB RECV | WB | WBSU | E |
| 0x3804 | WEB SEND | WB | WBSU | E |
| 0x7E02 | DUMP | DG | | C |

Other types of data fields are also contemplated by this disclosure.

The function identifier is a two-byte function code that identifies the command and corresponds to the function code found in the first argument, also known as "argument 0," of the command's parameter list generated by the CICS source translator. These function codes are documented in the CICS reference manuals.

Data stub creation relies upon a series of different stub objects 44. Stub objects can be used to group related commands into one stub object, such that each stub object 45 represents a different stub subtype of the CICS stub type. Three kinds of stub objects are implemented by the example embodiment although more or less kinds of stub objects are contemplated by this disclosure. Kinds of stub objects may include calls grouped by stub subtype with a signature (e.g., file control services for a particular file), calls grouped by stub subtype without a signature (e.g., Web services) and single-statement calls (e.g., EXEC CICS RETURN). Example stub object subtypes along with some commonly used commands are listed below.

CONDITION HANDLING (grouped, no signature)
        HANDLE CONDITION
        PUSH HANDLE
        POP HANDLE
        IGNORE CONDITION
    TERMINAL CONTROL (grouped, no signature)
        RECEIVE
        SEND
        CONVERSE
    PROGRAM CONTROL (grouped, signature is called subprogram name)
        LINK
        INVOKE APPLICATION
    STORAGE CONTROL (grouped, no signature)
        GETMAIN
        FREEMAIN
    TEMPORARY STORAGE (grouped, signature is queue name)
        WRITEQ TS
        READQ TS
        DELETEQ TS
    TRANSIENT DATA (grouped, signature is queue name)
        WRITEQ TD
        READQ TD
        DELETEQ TD
    FILE CONTROL (grouped, signature is file name)
        READ
        WRITE FILE
        REWRITE
        DELETE
        UNLOCK
        STARTBR
        READNEXT
        READPREV
        ENDBR
        RESETBR
    INTERVAL CONTROL (single-statement)
        ASKTIME
        DELAY
        CANCEL
    WEB SUPPORT (grouped, no signature)
        WEB RECEIVE
        WEB SEND
        WEB READ
        WEB STARTBROWSE
        WEB READNEXT
        WEB ENDBROWSE
        WEB WRITE
        WEB RETRIEVE
        WEB OPEN
        WEB CLOSE
        WEB CONVERSE
        WEB PARSE URL
    SYSTEM INTERFACE (single-statement)
        INQUIRE PROGRAM
        SET PROGRAM
        INQUIRE TRANSACTION
        SET TRANSACTION This listing is illustrative of stub subtypes and not intended to be limiting or exhaustive. The stub type field in the command translator table 42 identifies the stub object subtype for the corresponding CICS command.

Additionally, each CICS command may include one or more arguments (or parameters). Therefore, each entry in the command translator table 42 further includes a listing of possible arguments associated with the given CICS command. For each possible argument, a category type is specified. Example category types include passed as a "sender option" (P) and returned as a "receiver option" (R). Passed arguments may be further categorized as for assertion (A), for look-up (L) and for validation (V). Other arguments may hold pointers and thus are categorized as always a pointer ($) or sometimes a pointer (*). A category type of X indicates that the argument is not used in the CICS command.

During unit testing of the application 31, the setup routine 41 interacts with the test configurator 32 to receive records from the test input file 34. In particular, the setup routine 41 receives the records which pertain to CICS commands. In the example embodiment, the setup routine 41 begins by instantiating a stub object for each of the different subtypes of stub objects 44. Alternatively, the setup routine 41 may instantiate a stub object in response to a record received from the test input file.

Upon receiving a record for a particular CICS command, the setup routine 41 creates a data stub for the particular CICS command in the mainframe environment. In the example embodiment, the data stub is a command object that is instantiated from a class representing the command type and is a property of a given stub object in the plurality of stub objects. Prior to instantiating the command object, the setup routine 41 retrieves an entry corresponding to the particular CICS command from the command translator table 42. The two-byte function code for the particular CICS command is contained in the record received from the test input file and used as a key to retrieve the corresponding entry in the command translator table 42.

Additionally, the setup routine 41 determines the arguments associated with the particular CICS command and instantiates an argument object for each argument. The argument objects is a property of the command object for the particular CICS command. In the example embodiment, the test input file further includes a record for each argument associated with a particular CICS command. In this case, the setup routine 41 instantiates the argument object in response to a record received from the test input file. The record contains a value for the argument which is used to update a property of the argument object.

FIGS. 4B and 4C further illustrate how the setup routine 41 updates the command objects for handling CICS commands in the mainframe environment. After building the command objects and the argument objects, the setup routine 41 updates these objects with an indicator of the expected options (i.e., arguments) used on a particular CICS call. As noted above, the two-byte function code for a particular CICS command is used as a key to retrieve the corresponding entry in the command translator table 42 as indicated at 55. The setup routine 41 also receives the parameter existence array at 56 which is passed along with the particular CICS command. The parameter existence array is a one-dimensional table where each bit indicates whether a positional argument is passed with the command, where one indicates it was passed and zero indicates it was not passed. Alternatively, the parameter existence array is a list where each byte indicates whether a non-positional argument is passed with the command, where non-zero identifies the option name of the argument that was passed and zero indicates end-of-list. A resolved parameter array is then formed at 57 through a logical conjunction (i.e., AND) of the entry from the command translator table with the parameter existence array. Thus, the resolved parameter array provides an indication of which arguments were passed and which were not passed and provides the category type for each argument passed with the particular CICS command. Lastly, the resolved parameter array is saved at 58 in a call object property of the command object of the particular CICS command for subsequent use during unit testing of the application.

The CICS simulator 36 further includes an interceptor routine 51 as seen in FIG. 5. During unit testing, the interceptor routine 51 serves as a single intercept point for CICS command calls made by the application program 31 being tested. When the application program 31 issues a CICS command, the call is intercepted by the CICS simulator 36. The interceptor routine 51 of the CICS simulator 36 in turn handles CICS calls by interacting with the command objects instantiated by the setup routine 41.

Figure 6A:
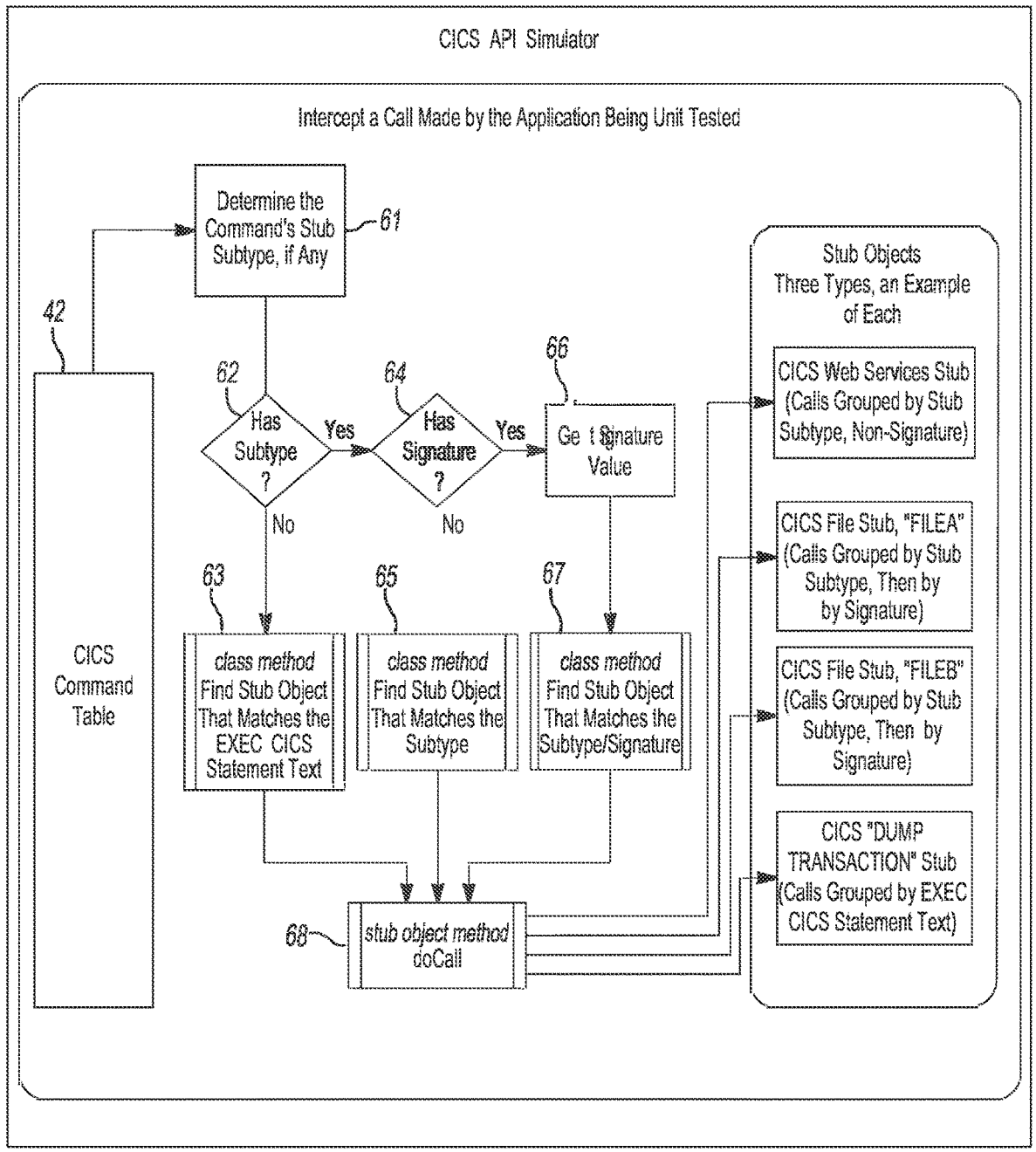

FIGS. 6A-6G further illustrates how the interceptor routine 51 handles calls made by the application 31 being unit tested. In FIG. 6A, the interceptor routine 51 first finds the stub object corresponding to the particular CICS command. To do so, the two-byte function code for the particular CICS command is used as a key to retrieve the corresponding entry in the command translator table 42 as indicated at 61. As noted above, the entry from the command translator table includes a stub type (also referred to as "subtype"). In some instances, when stub subtype is "null," a command's source statement text itself directly identifies the stub object as indicated at 63. In other instances, the calls are grouped by stub subtype without a signature. In these instances, the corresponding stub object is determined solely by stub subtype as indicated at 65 (e.g., all Web support commands belong to a single stub). In yet other instances, the calls are grouped by stub subtype with a signature. In these instances, the corresponding stub object is determined by combining stub subtype and signature value (e.g., for File subtype, the signature is the particular file's name; so, all commands operating on a certain file a program may use belong to one stub) as indicated at 67. Once the stub object is found, the interceptor routine 51 continues processing as indicated at 68.

Figure 6B:
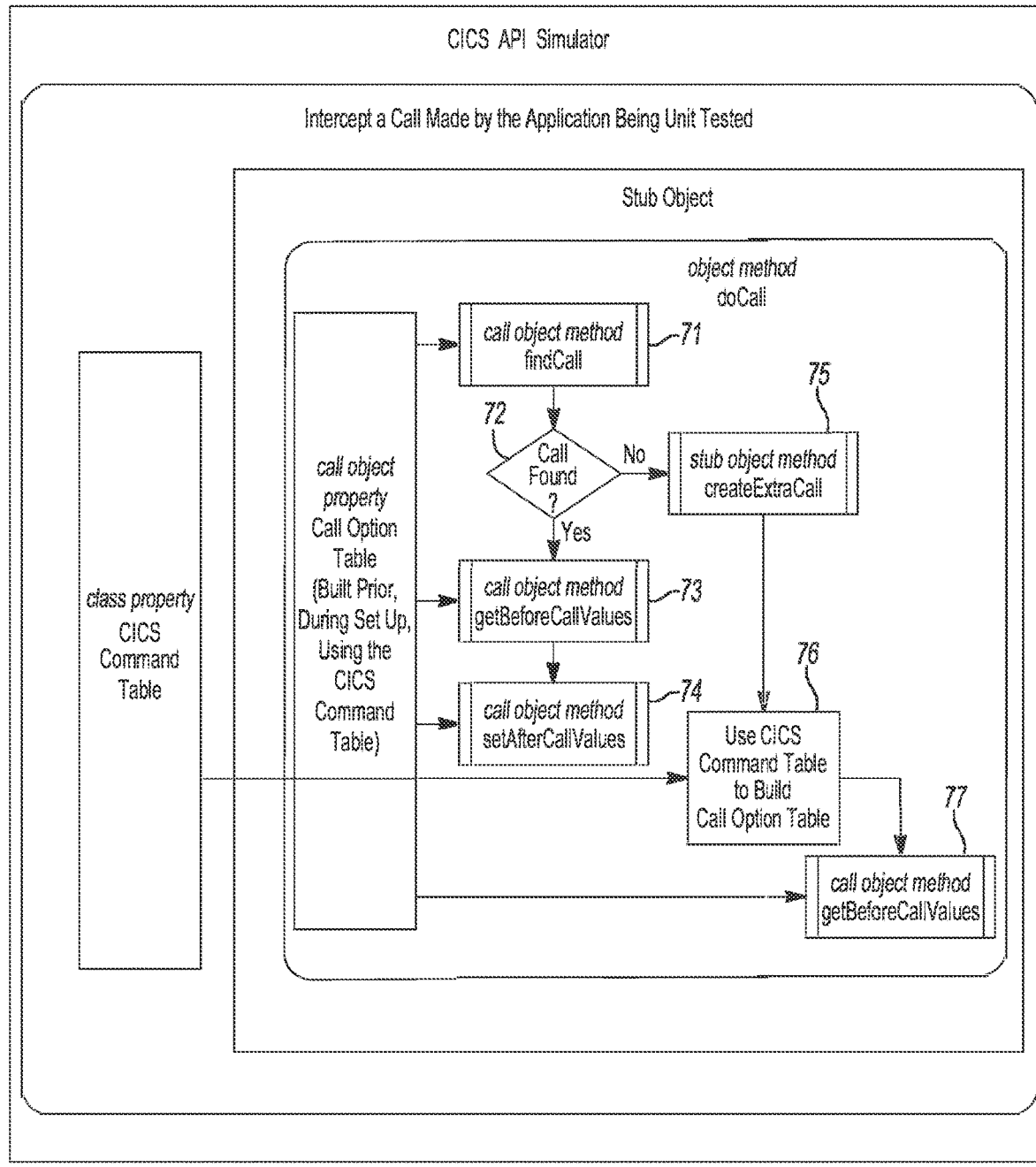

FIG. 6B provides an overview of the remaining processing performed by the interceptor routine 51. Because multiple command objects are associated with a stub object and the same command can be called multiple times, the interceptor routine 51 must identify the command object which corresponds to the command call as indicated at 71. This function is performed by the findCall method as will be further described below in relation to FIG. 6C. If the command object is found, the interceptor routine 51 performs two additional tasks. One task is to get and store data that is needed for assertion reporting prior to the execution of the call as indicated at 73 and the second task is to set return stub data that is needed by the logic of the target program after execution of the call as indicated at 74. The first task is performed by the getBeforeCall method shown in FIG. 6F and the second task is performed in the setAfterCall method shown in FIG. 6G.

On the other hand, if the command object is not found, data cannot be returned to the application 31 and the unit test will be terminated. However, to facilitate error reporting, a command object for the command is instantiated at step 75. Furthermore, the command object is updated with an indicator of the expected options (i.e., arguments) used by the missing CICS command at 76 and retrieves the data that is needed prior to the execution of the call at 77. As a result, the data passed with the missing CICS command can be included in the error reporting.

Figure 6C:
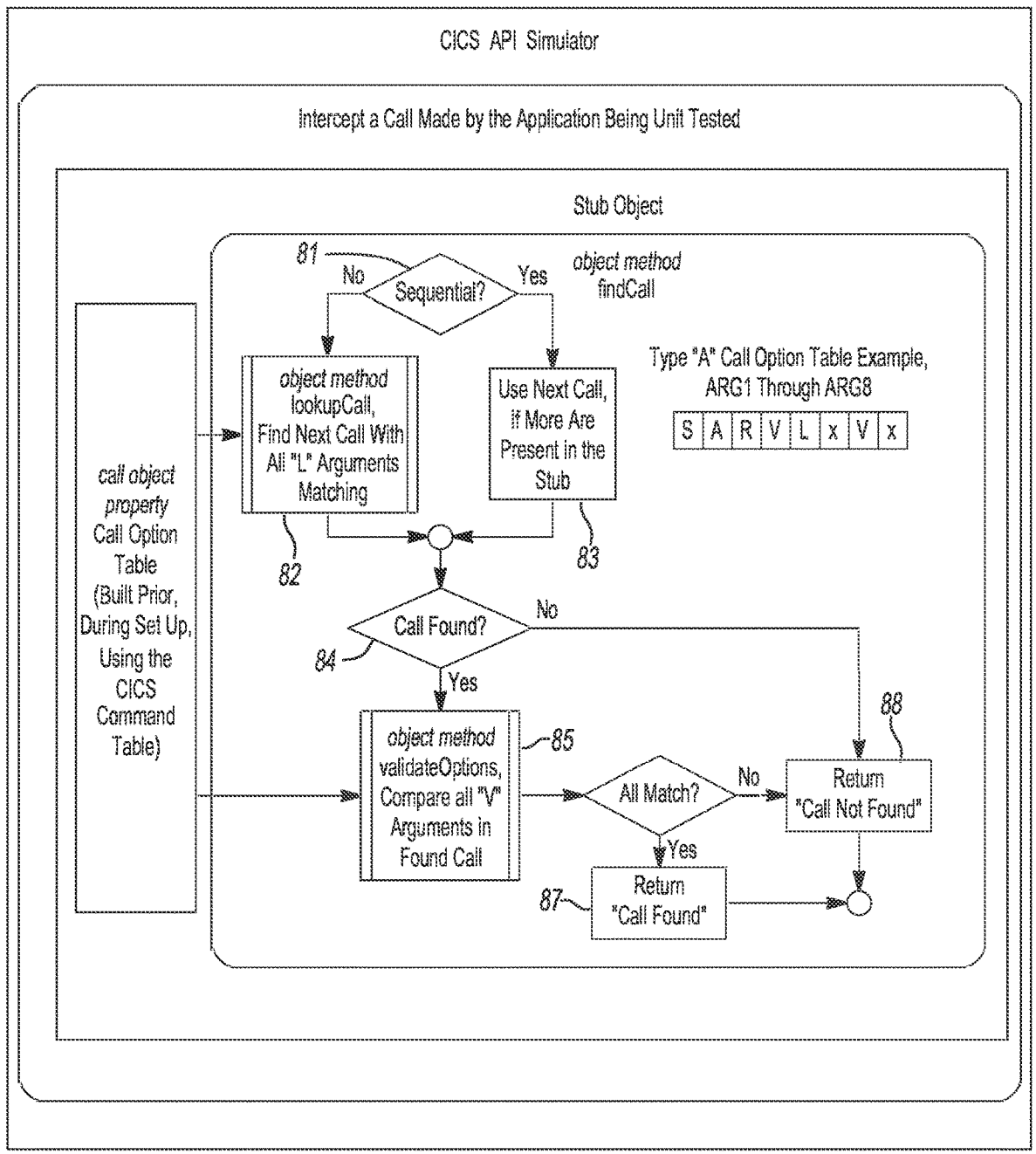
Figure 6D:
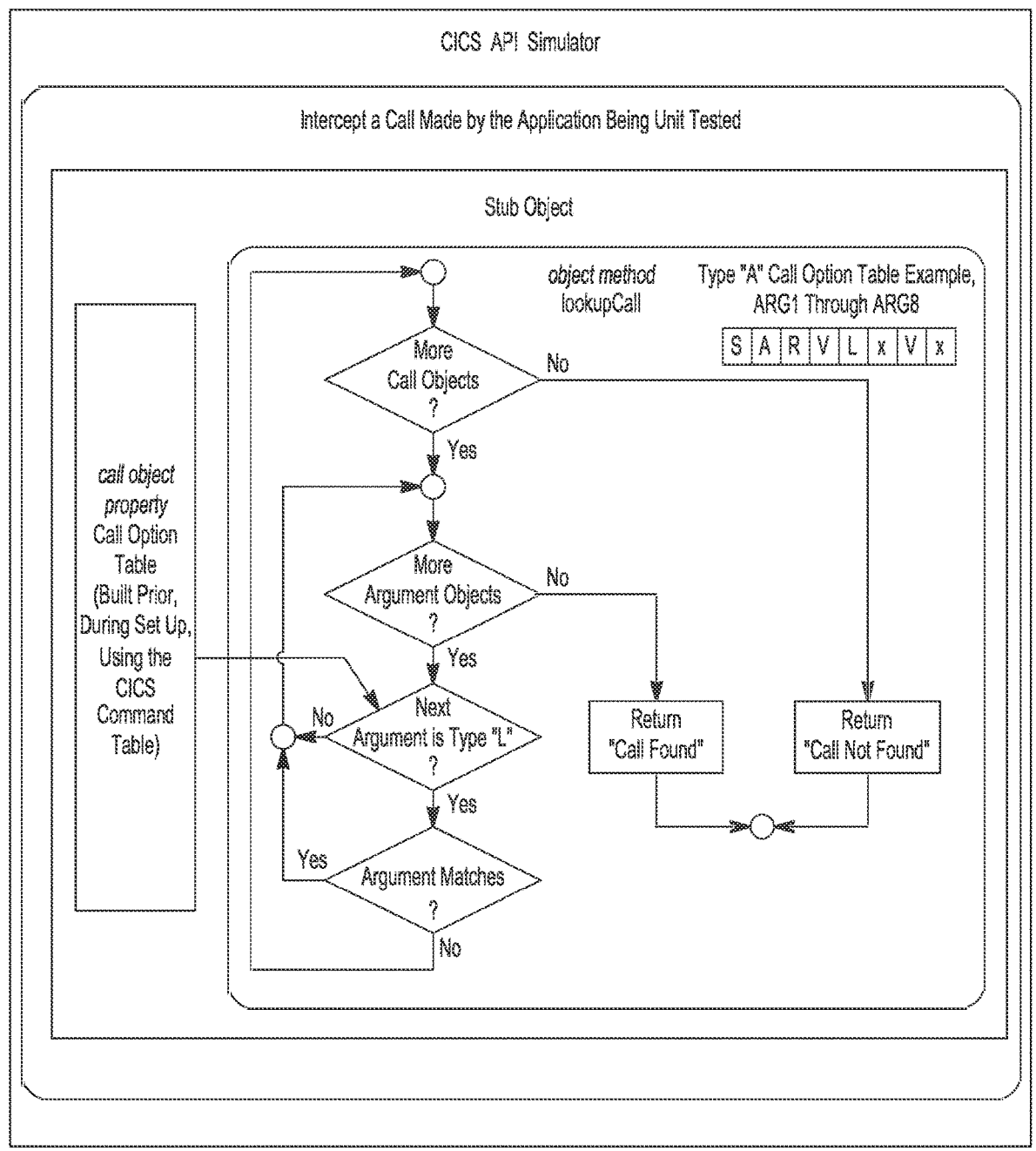
Figure 6E:
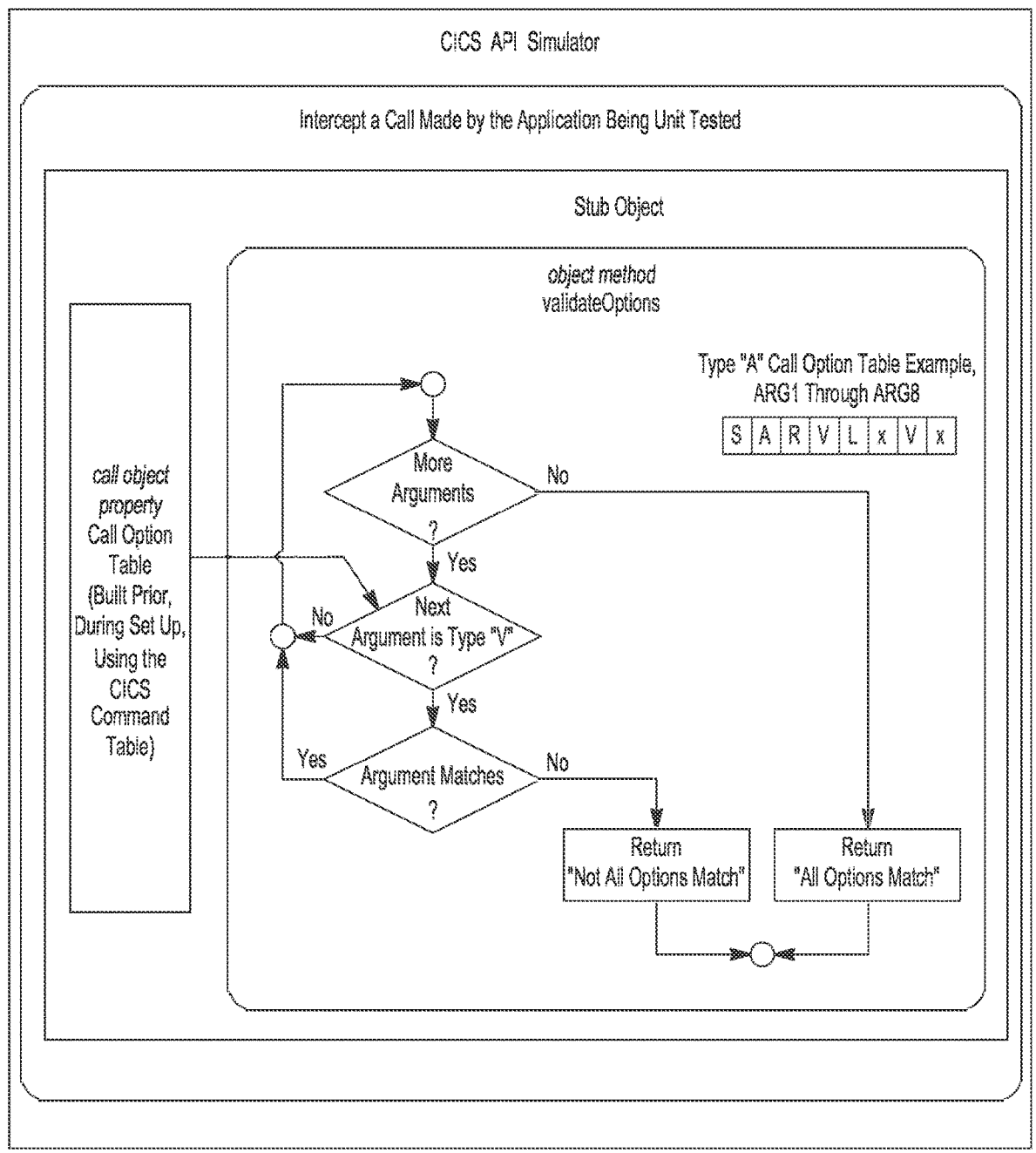
Figure 6F:
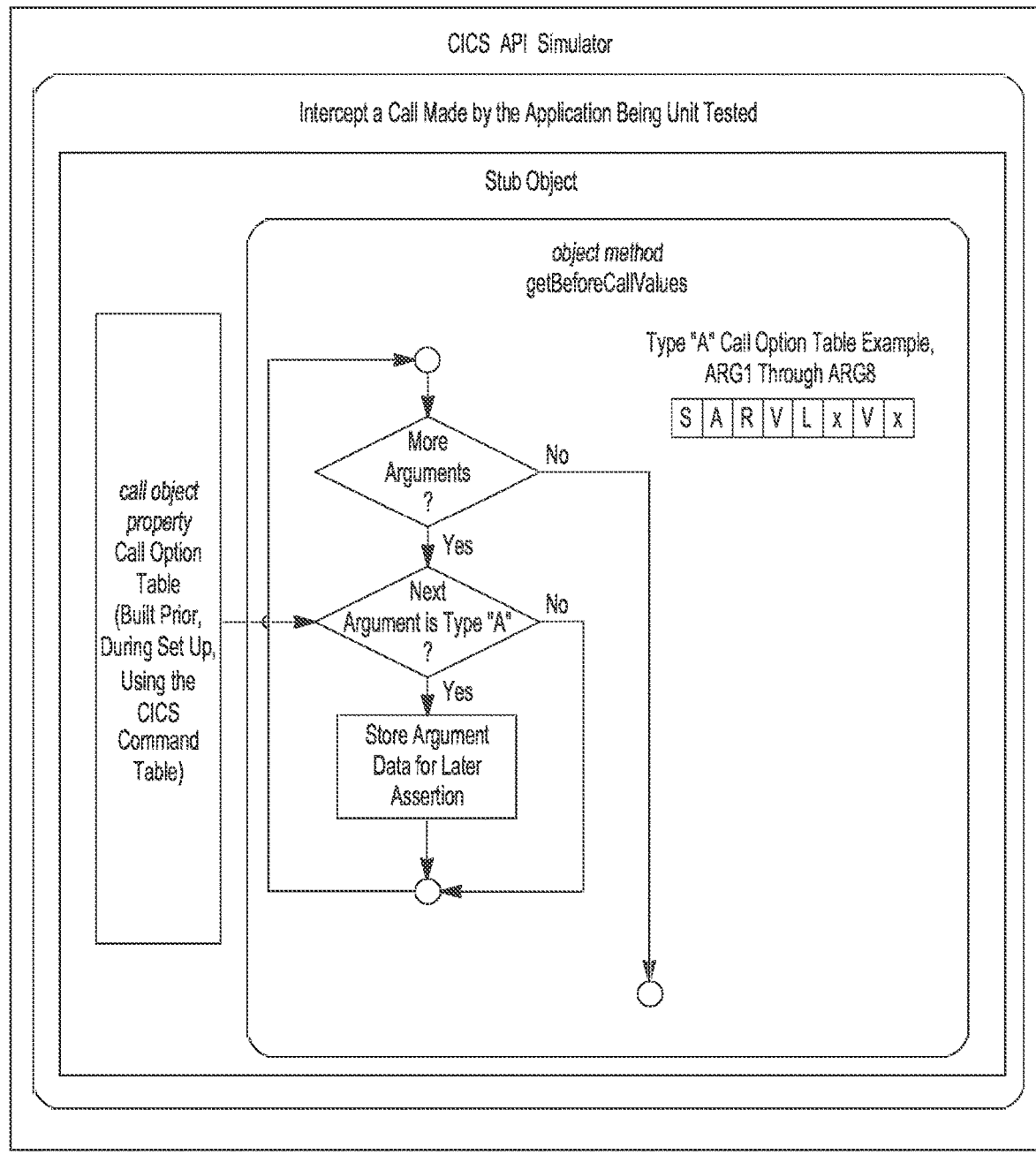
Figure 6G:
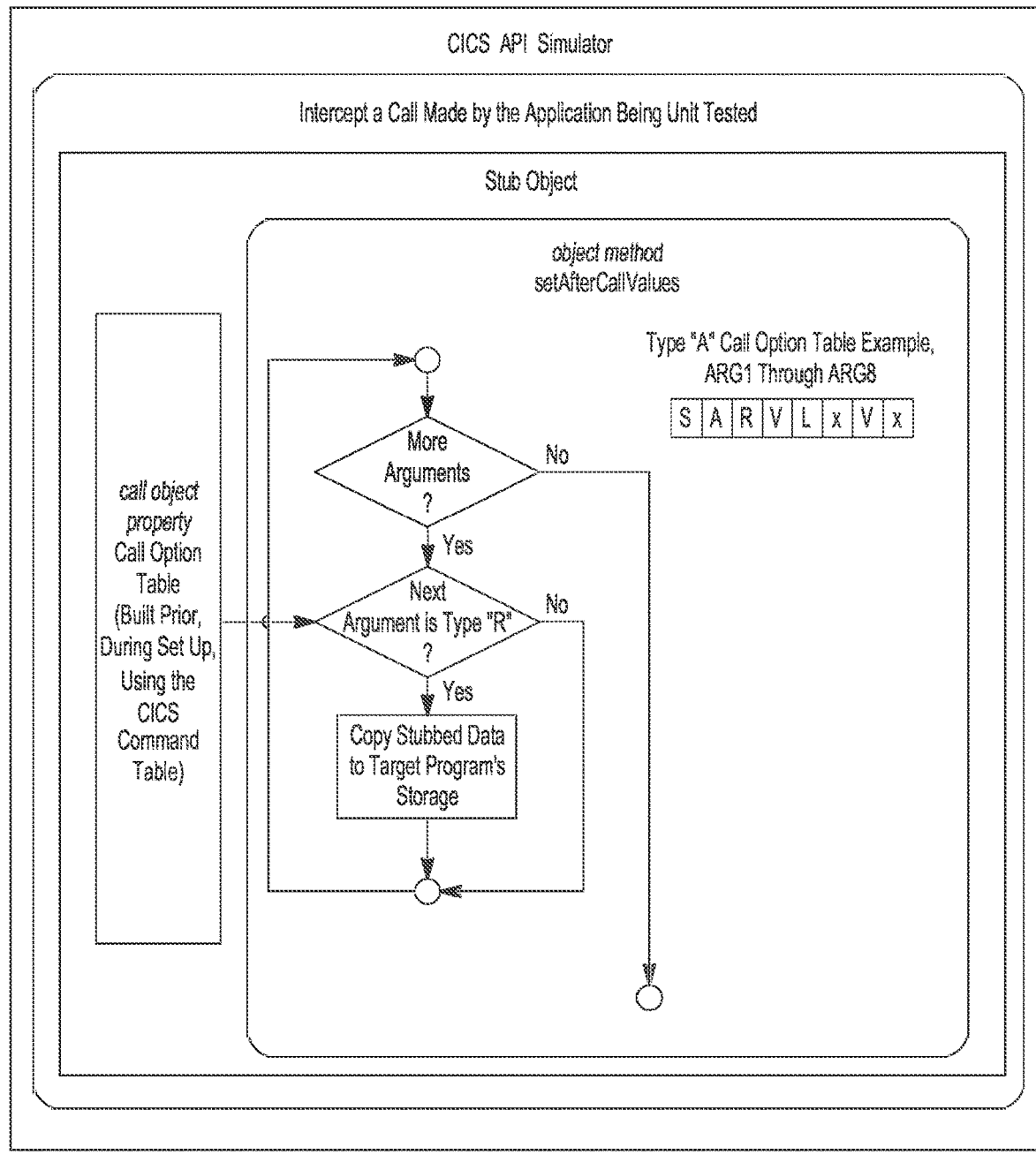

FIG. 6C depicts an example technique for finding the command object with corresponds to the command call. For command calls that are single statement stubs, all of the command objects for the stub object have the same statement and thus have the same resolved parameter array. In this case, the resolved parameter array can also be stored as a property of the stub object and used to find the command object that matches the particular CICS command. With reference to FIG. 6D, the command object is found by matching values of parameters passed with the CICS command to the corresponding values stored in the command object. For example, arguments with type "L" can be used to find the correct command object. For each command object of the stub object, the values of the passed parameters with type "L" are compared to the corresponding values stored in a given command object. If all of the arguments match, the command object is presumed to be found and processing continues with the command object whose values matched the passed parameters at step 84. Assuming the command object is found, arguments in the found command object can optionally be validated as indicated at 85. An example validateOptions method is shown in FIG. 6E. Likewise, if all of the arguments are validated, an indication that the command object is found is returned as indicated at 87; otherwise, an indication that the command object is not found is returned as indicated at 88.

Returning to FIG. 6C, for command calls that are not single statement stubs, command objects are processed sequentially as indicated at 83. That is, the next command object present in the stub object is used to handle the particular CICS command. Assuming the command object is found, arguments in the found command object can optionally be validated as indicated at 85. An example validateOptions method is shown in FIG. 6E. Likewise, if all of the arguments are validated, an indication that the command object is found is returned as indicated at 87; otherwise, an indication that the command object is not found as indicated at 88.

Creation of a test scenario for a unit test can be implemented in different ways. Components of the automated system 10 for unit testing which are used for creating a test scenario are shown in FIG. 7. On the desktop computer 12, a test recorder 72 is used to create the test scenario for the application. Source code for the application may be stored locally or accessed from the Debug Tool on the mainframe and accessible to the test recorder 72. Such test recorders are readily known to developers. In one example, the test recorder functionality is part of the Topaz Workbench mainframe application development tool note above.

A debugging tool 76 executes in the mainframe execution environment and coordinates testing of the application 77 in the mainframe execution environment. Xpediter debugging tool is one example of a commercially available debugging tool. In the example embodiment, the Topaz Workbench mainframe application development tool provides an API service 73 (i.e., Eclipse interface) for the test recorder 72 to interface with the debugging tool 76 in the mainframe execution environment.

After launching a debug session in the mainframe environment, the user will invoke a test generating dialog that allows them to customize the data to be captured, and specify the project where the test case and related objects are to be saved. The projects created extend the Eclipse project framework, and organize the various data objects in subfolders. Upon closure of the dialog, the test recorder 72 the API service 73 to get all the variables that are on the program's PROCEDURE USING statement. These variables obtained include the CICS DFHEIBLK and DFHCOMMAREA areas, even when implicitly defined by the source command translator instead of being explicitly defined in source code on the PROCEDURE USING statement. For each variable, the COBOL source definition and current value are also requested. These values are what will be used as input to the automated test case, and simulate the parameters used to invoke the target program during a unit test. While the example embodiment has been described with reference to Xpediter debugging tool, it will be appreciated that other types of debugging tools fall within the scope of this disclosure.

A data stub is a computer program used to simulate retrieval of data during a unit test. Typically, the data stub is written manually and must be updated whenever the data structure of the retrieved data changes. This disclosure provides an automated technique for creating data stubs. If the user has requested to stub calls made by the program, including CICS commands, and their data during a unit test, the Xpediter API service 73 is again invoked by the test recorder 72 to get a list of specific call statements from the program, and then adds an execution listener for each statement. This listener notifies its clients when a specific statement has executed. Example call statements may include but are not limited to:

| Statement Type | Stub Type | Grouped into stubs by |
| --- | --- | --- |
| CALL | Subprogram | Subprogram name |
| EXEC CICS | CICS command | Individual CICS command, or CICS command family subtype, or Subtype plus qualifier: file name, queue name, subprogram name, et cetera |
| EXEC SOL | SOL statement | Individual SOL statement, or Cursor name |

After setup of listeners, user can resume their Xpediter debug session.

Upon notification of a CICS command call execution event, the listeners collect the command option variables from the statement, both the "before call execution" and the "after call execution" sets, and the CICS DFHEIBLK area from after the call execution. What these variables are is dependent on the particular CICS command.

Once the variables are collected, the Xpediter API service 73 is called to get the COBOL definition, and current values for each variable. Pointer variables are identified and dereferenced to collect their data in the same manner. The codepage is also captured from the mainframe connection for data conversion purposes. Once the data is complete, a service of the test recorder 72 is called to actually create the stub and its related data objects as described above. The creation and use of pointer data stubs works for CICS and Batch and other programs including IMS programs.

The development tool 11 uses an EMF modeling framework to organize and save data objects to the workspace. XML schema's are used to serialize objects (e.g., .listructure) in the model. Each file type that is written to the workspace is described below.

In an example embodiment, each COBOL variable definition text gets passed to an XML converter, such as the CB2XML open source COBOL parser. An XML String is returned that has been converted to a listructure format. Some of the properties described in this object are:
Storage length
Data type
Display length
Redefines
Scale
Signed
Synchronized The interface (.interface) is the arguments used for a particular call, and simulates what the program is expecting to receive. It is comprised of one or more listructure objects in a specific order. The usage of each listructure can be defined in the interface as "in", "out", or "in/out", based on how they are used by program.

Once the listructure and interface have been created, the binary data that has been captured in the Xpediter debug session is mapped to the underlying structures. Each field in the interface gets a unique id that is used in the creation of a persistent data object that is put into each stub. The organization of data is as follows:

<Stub>
  <StubData> one per statement execution instance
  <Interface>
      <Output>
          <Persistent Data...>
      - Binary data converted to hex format data
      - Hex format data converted to displayable string character based on underlying listructure
      < Property>
          Value - converted displayable string character
      </Property>
          <Check Conditions>
      - For stubs that will be used for assertions (e.g.; CICS WRITE, CICS SEND, SOL UPDATE), check conditions are created from value properties.

Each execution of a statement or command will add a "record" to a stub, in the form of a stub data object. In the case of an EXEC CICS command, this means recording data for each command call to CICS. There may be multiple records for each EXEC CICS command.

At the end of the debugged program, the Xpediter API service will notify its listeners that the program has ended. The variables initially collected at the beginning of the program are once again interrogated for current values that will be used to create assertions for the test case. This results in both input and output data for a given test case. All stubs that were created during program execution are added to the newly created test case (.testscenario). The test scenario file holds one or more test cases, which each execute a target program.

```
<test scenario>
    <testcase>
        <interface>
            <input>
                <Persistent Data...>
    - Input binary data from beginning of capture converted to
    hex format data converted to displayable string character based
    on underlying listructure
    < Property>
            Value - converted displayable string character
    </Property>
            <Check Conditions>
    - output binary data from end of program converted to
    hex format data
    - hex data format converted to displayable string
    character and check condition created from value <Stubs>
    - list of stubs to be included in testcase execution
In this way, a test scenario for a unit test can be created using, for
example the Xpediter debugging tool.
```

Supporting pointer data most effectively during a test run requires tailoring stubbing behavior of pointers and the data they reference. Behavior is tailored at the level of each pointer field defined in source code. A single argument can be a single pointer field or a data structure containing one or more pointer fields. Each pointer field of a call argument has defining characteristics: owned by the calling program; owned by the called program; owned by the calling and called program; and Null. "Owned by" refers to the program that sets the pointer field's value, the address of the data to which it points.

Data referenced by a pointer field is of the same class as a regular data field, with the same characteristics and stubbing behavior requirements as described above. When the program calls are to an external vendor product (e.g.; IBM IMS, IBM CICS) and the vendor documents the characteristics of pointer fields, that documentation can be used to determine the rules used to tailor stubbing behavior for individual call arguments and their pointer fields. When the program calls are application subprogram calls, no apparent means exists to determine the rules used to tailor stubbing behavior for individual call arguments and their pointer fields. Therefore, for application subprogram calls, a system is required to automate, with minimal or no user input, determination of characteristics of pointer fields contained in arguments.

When creating data structure stubs for structures with pointer fields, additional work is required to correctly capture the data associated with pointer fields. The pointer must be dereferenced and followed to the data area and the data collected based upon the size of the associated structure. The data is later formatted for display and reporting based upon the associated data structure. Once these values are collected from the program while testing they can be compared with known expected values or compared with previously collected values to evaluate any differences.

An example process for handling pointers is described in relation to FIGS. 8A-8C. The debugging tool 76 with source support reads the program source listing and tags all data fields with a unique identifier provided by a source listing processor as indicated at 81. While executing the program, the debugging tool 76 collects data field values. Each field is "cataloged" with unique field identifier, qualified field name, line number. Each field has a unique identifier so that a qualified field name doesn't have to be constantly parsed. The unique identifier is used for obtaining expected data field values.

The application program is scanned at 82 to find pointer fields in source code, for example using a program analyzer. Program analyzer parses the program and returns a table of pointer fields and potential pointer fields and the line number, qualified name, an indication if it is a redefined, an indication if it is used on a COBOL SET statement, and indications of how moved to and from other fields. A language parser may be used to scan the program.

A Pointer Reference Table is created at 83 by the test recorder 72 from the program analyzer information to hold the pointer fields' names and aliases and flows (a pointer is moved from field A to field B, etc.), and structures associated with dereferenced pointer data. An example of the Pointer Reference Table is shown below.

| Identifier | Reference to Structure |
| --- | --- |
| Field1.Field2.Ptr | ACCT REC |
| Field2.Ptr | ACCT REC ACCT |
| Ptr | REC |

Each entry in the pointer reference table includes an identifier for a particular pointer date field and a reference to a structure associated with the particular pointer data field, where the reference to the structure is a unique identifier. The pointer reference table also includes aliases for a particular pointer data field.

The test recorder 72 directs the API service 73 at 84 to set breakpoints on COBOL CALL, EXEC CICS, and EXEC SQL statements, etc. "Before call" and "after call" breakpoints are set on these statements. This allows parameter data to be collected before and after each statement call. Source Listing Support (SLS) has tagged each statement with its type, identifying which are CALL or EXEC statements; this is used to know on which statements to set breakpoints.

Once the above setup has been completed, the application program is loaded by the debugger 76 and the program is executed until a breakpoint is encountered in the debugger 76. When a breakpoint is encountered, a check is done to determine if the statement contains any pointer fields. If it does, the pointer is dereferenced or resolved at 85 to get the "before" and "after" data values based on the structure associated with the pointer; the unique identifier of this structure is obtained using the Pointer Reference Table. The "before" value is the value immediately before the call is executed; whereas, the "after" value is the value immediately after the execution of the call.

A stub record is created at 86 for every program call statement (e.g., every EXEC statement and every COBOL CALL statement). If the statement arguments contain one or more pointer fields, a stub is created containing the pointer information. More specifically, when the debugger hits a breakpoint, it gets all arguments on the statement and works through each argument checking the Pointer Reference Table to determine if it contains a pointer (is named or is contained in the structure by reviewing the alias names). If the pointer field is associated with only a single structure, the structure referenced by the pointer is retrieved using the unique identifier of the field. If the pointer field is associated with more than one structures, instead of the using the unique identifier of the field, all possible references for the field are obtained from the Pointer Reference Table. Using the unique identifier of the references, the debugger is asked to return the current addresses of the references. The reference with the matching address is used as the pointer reference. The unique identifier, of the matching reference, is then used to get its field name and the COBOL structure data values. Pointers can be passed directly as a parameter or passed as a field within a larger structure. The Pointer Reference Table holds all the ways a pointer field is referenced and used; this feature is needed in the case when pointers are contained within a structure.

Support of nested levels of pointers is required when a pointer field is contained in an area of dereferenced pointer data. If a pointer is found in a pointer data area, it can be looked up by address and data can be gathered from the new area. If further levels of pointer nesting are found, the process is repeated until a null pointer is found or no pointers are found. A recursive search for the nested pointers can be done by calling Program Analyzer for each structure associated with a pointer again and again. Recursively searching for pointers within structures is needed to support arbitrarily nested pointers in structures. The data collection code must traverse down all structures to determine if any pointers are contained in them. Every time a pointer is found, an entry is created in a field catalog table. The field name qualification allows the same name to be used at the different nesting levels so nested fields can be uniquely identified.

If the pointer value (address) is null or invalid, this process is not performed, and a stub record is created for the EXEC statement or COBOL CALL statement without data values for the pointer field. Otherwise, a stub record containing the pointer information is created for the EXEC statement or COBOL CALL statement.

Each field within a structure needs to identify whether it is passed or returned or both passed and returned; this includes structures associated with dereferenced pointer data. We need to know the expected behavior of the field so we can avoid storage exceptions caused by writing into a "protected" field. One approach for supporting pointers requires that the Test Recorder know whether each pointer variable is used to pass data, return data, or pass and return data. Three contexts are relevant: target program arguments, subprogram arguments, and CICS command option arguments. The program that is the target of the unit test has inputs passed to it and returns outputs to its caller. The target program may pass outputs to subprograms and expect inputs to be returned from subprograms. Likewise, the target program may pass outputs on CICS commands and expect inputs to be returned from CICS commands. When an argument is a structure that holds multiple pointers, some of those pointers may be used to pass data and some may be used to return data.

Two of these three contexts require additional information. Supporting pointers found in subprogram arguments and certain CICS command option arguments also requires that the Test Recorder determine the owner of the pointer; this is not needed for target program arguments. The pointer owner is the routine that sets the address of the data area into the pointer field. The caller of a subprogram can set the address and be the owner when either passing data or expecting data to be returned. A called subprogram can set the address and be the owner only when returning data. Both the caller and the subprogram can be an owner when the caller passes data to the subprogram pointing to an area of its storage and the subprogram resets the pointer address to return data pointing to an area of its storage.

The pointer analysis phase during generation of a unit test and collection of data by Test Recorder must gather the information either from analyzing the arguments of the running program or from the user in the case where analyzing the running program results in ambiguity. This information includes pointer ownership and/or whether it is used to pass data, to return data, or to both pass and return data. A single execution cannot definitively indicate whether passed data that was not changed wouldn't ever be changed. Therefore, patterns found during analyzing multiple executions of a call can be used to better determine this information. If only a few calls are made the user would need to answer this question after the test case is created through the user interface. This information about ownership and passed/returned status must be provided to the Test Configurator as part of the test input file so the Test Configurator can properly simulate the data of the stubbed subprogram parameters and certain CICS command option arguments when the contain pointer fields. Information about passed/returned must be provided to the Test Configurator as part of the test input file so the Test Configurator can know which target program arguments, stubbed subprogram arguments, and CICS command option arguments represent data areas eligible for assertion.

During a test run, when a subprogram call or CICS command is intercepted, a check is done to determine if an argument is a pointer field or structure that contains one or more pointer fields. For the Test Configurator to use the nested pointer data, if needs to understand the hierarchy of structures so memory areas can be initialized correctly. The Test Configurator does not need to know about source code structure names and field names, currently. Field qualification is determined by the sequence of test input file. This example is for the TARGET record, which represents the program being tested, but is similar for the STUB record used for subprogram stubs:

TARGET: the record announcing the name of the target program.

ARGVAL: one record for each target program argument's data; could be data of a single field or of a structure.

PTRINFO, Version 1: immediately follows an ARGVAL record when that ARGVAL data contains one or more pointers. PTRINFO holds an array, one element for each pointer field in the preceding ARGVAL data, that holds information about the pointer field—offset within the ARGVAL data (e.g.; zero when a single pointer field argument). Version 2, for subprogram stubs also holds an indication of who owns the pointer in each element: target program or subprogram.

PTRDATA: one record for each pointer field in the preceding ARGVAL data. PTRDATA holds the passed/return flag, the assertion flag, and the actual data to which the pointer points. Each record correlates to an element in PTRINFO.

PTRINFO for nested: immediately follows a PTRDATA record when that PTRDAT A data contains one or more pointers-same as when following ARGVAL . . . .

PTRDATA for nested: one record for each pointer field in the preceding PTRDATA data-same as when following ARGVAL . . . .

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for unit testing an application in a mainframe execution environment, comprising:
   accessing a plurality of stub objects, where each stub object in the plurality of stub objects represents a different stub type;
   receiving, at a test recorder executed by at least one processor using instructions stored on at least one non-transitory computer-readable storage medium, a request to test the application and, in response to receiving the request, scanning source code of the application to identify pointer data fields in the application and building a pointer reference table, where each entry in the pointer reference table includes an identifier for a particular pointer data field and a reference to a structure associated with the particular pointer data field;
   executing a debug tool executed by at least one processor using instructions stored on the at least one non-transitory computer-readable storage medium to coordinate testing of the application in the mainframe execution environment;
   upon encountering a breakpoint for a given program call statement during execution of the application, retrieving, at the debug tool, arguments of the given program call statement and, for each argument, determining whether the argument contains a pointer and resolving the pointer using the pointer reference table;
   creating, at the test recorder, a record for the given program call statement in a test input file for the application, where the record includes the resolved pointer data; and
   creating, upon reading at least one record from the test input file, an object for the given program call statement using the resolved pointer data, wherein the program call statement object is instantiated from a class representing a call statement type and is a property of a given stub object in the plurality of stub objects.

2. The method of claim 1 comprising:
   enumerating, at the test recorder, aliases for a given pointer data field; and
   creating an entry in the pointer reference table for each alias for the given pointer data field.

3. The method of claim 1 comprising:
   resolving, at the debug tool, a given pointer in a given argument by fetching the reference to the structure associated with the given pointer from the pointer reference table and retrieving the structure associated with the given pointer using the fetched reference.

4. The method of claim 1 comprising:
   resolving, at the debug tool, a given pointer in a given argument by fetching all possible references to the structure associated with the given pointer;
   for each possible reference, determining a current memory address for the reference; and
   retrieving the structure associated with the given pointer using the reference which matches the current memory address.

5. The method of claim 1 comprising:
directing, at the test recorder, the debug tool to set breakpoints before and after each program call statement in the application.

6. The method of claim 1 wherein the given program call statement is further defined as a command for an online transaction processor.

7. The method of claim 1 wherein the test recorder resides on a computing device outside of the mainframe and communicates with an interface of the debug tool residing on the computing device.

8. An automated system for unit testing an application in a mainframe execution environment that includes at least one processor and at least one non-transitory computer-readable storage medium storing instructions that when executed by the at least one processor, cause the at least one processor to:
store a plurality of stub objects, where each stub object in the plurality of stub objects represents a different stub type;
receive, at a test recorder executed by the at least one processor using the instructions stored on the at least one non-transitory computer-readable storage medium, a request to test the application and, in response to receiving the request, scan source code of the application to identify pointer data fields in the application and build a pointer reference table, where each entry in the pointer reference table includes an identifier for a particular pointer data field and a reference to a structure associated with the particular pointer data field;
coordinate, at a debug tool executed by the at least one processor using the instructions stored on the at least one non-transitory computer-readable storage medium, testing of the application in the mainframe execution environment, including, upon encountering a breakpoint for a given program call statement during execution of the application, retrieving arguments of the given program call statement and, for each argument, determining whether the argument contains a pointer and, if so, resolving the pointer using the pointer reference table;
create, at the test recorder, a record for the given program call statement in a test input file for the application, where the record includes the resolved pointer data; and
create, upon reading at least one record from the test input file, an object for the given program call statement using the resolved pointer data, wherein the program call statement object is instantiated from a class representing a call statement type and is a property of a given stub object in the plurality of stub objects.

9. The automated system of claim 8 wherein the test recorder enumerates aliases for a given pointer data field and creates an entry in the pointer reference table for each alias for the given pointer data field.

10. The automated system of claim 8 wherein the debug tool resolves a given pointer in a given argument by fetching the reference to the structure associated with the given pointer from the pointer reference table and retrieving the structure associated with the given pointer using the fetched reference.

11. The automated system of claim 8 wherein the debug tool resolves a given pointer in a given argument by fetching all possible references to the structure associated with the pointer; for each possible reference, determining a current memory address for the reference; and retrieving the structure associated with the pointer using the reference which matches the current memory address.

12. The automated system of claim 8 wherein the test recorder directs the debug tool to set breakpoints before and after each program call statement in the application.

13. The automated system of claim 8 wherein the given program call statement is further defined as a command for an online transaction processor.

14. The automated system of claim 8 wherein the test recorder resides on a computing device outside of the mainframe and communicates with an interface of the debug tool residing on the computing device.

\* \* \* \* \*